(12) United States Patent
Kimpe

(10) Patent No.: US 8,164,598 B2
(45) Date of Patent: Apr. 24, 2012

(54) DISPLAY ASSEMBLIES AND COMPUTER PROGRAMS AND METHODS FOR DEFECT COMPENSATION

(75) Inventor: Tom Kimpe, Ghent (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 13/250,925

(22) Filed: Sep. 30, 2011

(65) Prior Publication Data

US 2012/0019529 A1    Jan. 26, 2012

Related U.S. Application Data

(62) Division of application No. 11/940,593, filed on Nov. 15, 2007.

(60) Provisional application No. 60/866,431, filed on Nov. 19, 2006.

(51) Int. Cl.
*G09G 5/00* (2006.01)

(52) U.S. Cl. .......... 345/629; 345/690; 345/204; 345/88; 382/274; 382/275

(58) Field of Classification Search .................. 345/629, 345/689–690, 203–204, 88; 382/274–275
See application file for complete search history.

(56) References Cited

U.S. PATENT DOCUMENTS

| | | | |
|---|---|---|---|
| 5,208,689 A | 5/1993 | Hartmann |
| 5,225,919 A | 7/1993 | Nakao |
| 5,289,174 A | 2/1994 | Suzuki |
| 5,359,342 A | 10/1994 | Nakai |
| 5,432,461 A | 7/1995 | Henley |
| 5,504,504 A | 4/1996 | Markandey |
| 5,708,451 A | 1/1998 | Baldi |
| 5,982,946 A | 11/1999 | Murakami |
| 6,089,739 A | 7/2000 | Yamamoto |
| 6,111,424 A | 8/2000 | Bosacchi |
| 6,115,092 A | 9/2000 | Greene |
| 6,154,561 A | 11/2000 | Pratt |
| 6,359,662 B1 | 3/2002 | Walker |
| 6,618,115 B1 | 9/2003 | Hiroki |
| 6,704,008 B2 | 3/2004 | Naito |
| 6,806,870 B1 | 10/2004 | Takanashi |
| 6,891,672 B2 | 5/2005 | Whitehead |
| 6,985,127 B1 | 1/2006 | Russell |
| 6,985,272 B2 | 1/2006 | Bridgwater |
| 7,053,976 B2 | 5/2006 | Hiroki |
| 7,061,226 B2 | 6/2006 | Durr |
| 7,061,533 B1 | 6/2006 | Urushiya |
| 7,295,233 B2 | 11/2007 | Steinberg |

(Continued)

FOREIGN PATENT DOCUMENTS

EP          0462619 B1     9/1997

(Continued)

OTHER PUBLICATIONS

T. Kimpe et al. 7.3: Solving the problem of pixel defects in matrix displays based on characteristics of the human visual system. EuroDisplay 05, Edinburgh, UK, Sep. 2005. (3 pp.).

(Continued)

*Primary Examiner* — Jin-Cheng Wang

(74) *Attorney, Agent, or Firm* — Hartman Patents PLLC

(57) ABSTRACT

The range of embodiments includes systems, methods, and apparatus for defect compensation that may be applied to displays having multiple imaging layers, such as high dynamic range displays, and/or to stereoscopic displays, such as autostereoscopic displays.

20 Claims, 22 Drawing Sheets

U.S. PATENT DOCUMENTS

| | | |
|---|---|---|
| 2001/0024178 A1 | 9/2001 | Takeuchi |
| 2001/0041489 A1 | 11/2001 | Takeuchi |
| 2002/0000983 A1 | 1/2002 | Lee |
| 2002/0047568 A1 | 4/2002 | Koyama |
| 2002/0105579 A1 | 8/2002 | Levine |
| 2002/0154076 A1 | 10/2002 | Greene |
| 2004/0047023 A1 | 3/2004 | Sandstrom |
| 2004/0164939 A1 | 8/2004 | Johnson |
| 2004/0174320 A1 | 9/2004 | Matthijs |
| 2004/0207386 A1 | 10/2004 | Durr |
| 2005/0162737 A1 | 7/2005 | Whitehead |
| 2005/0169551 A1 | 8/2005 | Messing |
| 2005/0248520 A1 | 11/2005 | Feng |
| 2005/0248524 A1 | 11/2005 | Feng |
| 2005/0276448 A1 | 12/2005 | Pryor |
| 2006/0066547 A1 | 3/2006 | Nitta |
| 2006/0109231 A1 | 5/2006 | Koyama |
| 2006/0158729 A1 | 7/2006 | Vissenberg |
| 2006/0164407 A1 | 7/2006 | Cok |
| 2006/0167670 A1 | 7/2006 | Deering |
| 2006/0176935 A1 | 8/2006 | Hiroki |
| 2006/0238464 A1 | 10/2006 | Hillis |
| 2006/0262147 A1 | 11/2006 | Kimpe |
| 2007/0109327 A1 | 5/2007 | Cok |
| 2007/0126657 A1 | 6/2007 | Kimpe |
| 2007/0230818 A1 | 10/2007 | Messing |
| 2007/0257866 A1 | 11/2007 | Cok |

FOREIGN PATENT DOCUMENTS

| | | |
|---|---|---|
| EP | 0833183 A1 | 4/1998 |
| EP | 1424672 A1 | 6/2004 |
| EP | 1536399 A | 6/2005 |
| EP | 1801752 A2 | 6/2007 |
| GB | 2398130 A | 8/2004 |
| JP | 59126967 A | 7/1984 |
| JP | 11-174106 A | 7/1999 |
| JP | 2002-340739 A | 11/2002 |
| JP | 2004-070009 A | 3/2004 |
| WO | 03/069380 A1 | 8/2003 |
| WO | 03/100756 A2 | 12/2003 |
| WO | 2005/052902 A1 | 6/2005 |
| WO | 2005101855 A1 | 10/2005 |

OTHER PUBLICATIONS

T. Kimpe. Making defective LCD display pixels invisible. Last accessed Dec. 25, 2007 at http://spie.org/documents/Newsroom/Imported/195/2006040195.pdf (2 pp.).

L.J. Kerofsky et al. 15.2: Optimal rendering for Colour Matrix Displays. ADEAC 05, Oct. 2005, Portland, OR, pp. 123-126.

D.S. Messing et al. 15.3: An Application of Optimal Rendering to Visually Mask Defective Subpixels. ADEAC 05, Oct. 2005, Portland, OR, pp. 127-129.

H. Seetzen et al. p. 54.2: A High Dynamic Range Display Using Low and High Resolution Monitors. SID 03 Digest. Last accessed Dec. 25, 2007 at http://www.anyhere.com/gward/papers/sid03.pdf (4 pp.).

H. Seetzen et al. High Dynamic Range Display Systems. ACM SIGGRAPH 2004. Last accessed Dec. 25, 2007 at http://www.cse.yorku.ca/~wolfgang/papers/hdrdisplays.pdf (9 pp.).

N. A. Dodgson et al. Multi-View Autostereoscopic 3D Display. IBC '99, Amsterdam, NL, Sep. 1999. Last accessed Dec. 25, 2007 at http://www.cl.cam.ac.uk/~nad10/pubs/IBC99-Dodgson.pdf (6 pp.).

J. Harrold et al. Switchable 2D/3D Display—Solid Phase Liquid Crystal Microlens Array. IDW 04, Niigata, Japan, Dec. 2004. Last accessed Dec. 25, 2007 at http://www.ocuity.co.uk/Ocuity_IDW_04.pdf (2 pp.).

G. Woodgate et al. Key design issues for autostereoscopic 2D/3D displays. EuroDisplay 05, Edinburgh, UK, Sep. 19, 2005. Last accessed Dec. 25, 2007 at http://www.ocuity.co.uk/Ocuity_EuroDisplay_05.pdf (4 pp.).

J. Harrold et al. Switchable Brightness Enhancement for Transflective TFT LCDs and OLED displays. IDW 03, Fukuoka, Japan, Dec. 2003. Last accessed Dec. 25, 2007 at http://www.ocuity.co.uk/Ocuity_IDW_03.pdf (2 pp.).

G. J. Woodgate et al. A New Architecture for High Resolution Autostereoscopic 2D/3D Displays using Free-Standing Liquid Crystal Microlenses. SID 05 Digest, Boston, MA, May 24, 2005. Last accessed Dec. 25, 2007 at http://www.ocuity.co.uk/Ocuity_SID_05.pdf (4 pp.).

G.J. Woodgate et al. Resolution Artefacts in Multi-View Autostereoscopic 2D/3D Displays. SID 06, San Francisco, CA, Jun. 5, 2006, 14.1. Last accessed Dec. 25, 2007 at http://www.ocuity.co.uk/Ocuity_SID_06.pdf (4 pp.).

G.J. Woodgate et al. High Efficiency Reconfigurable 2D/3D Autostereoscopic Display. SID 03 Digest, Baltimore, MD, May 2003, LP.1. Last accessed Dec. 25, 2007 at http://www.ocuity.co.uk/Ocuity_SID_DIGEST_2003.pdf (4 pp.).

P. May. Reconfigurable 2D/3D Displays. Last accessed Dec. 25, 2007 at http://www.ocuity.co.uk/Ocuity_white_paper_Reconfigurable_2D-3D_Displays.pdf (9 pp.).

P. May. A Survey of 3D Display Technologies. Last accessed Dec. 25, 2007 at http://www.ocuity.co.uk/Ocuity_white_paper_Survey_of_3D_display_technologies.pdf (8 pp.).

G.M. Johnson et al. On Contrast Sensitivity in an Image Difference Model. Last accessed Dec. 25, 2007 at http://www.cis.rit.edu/people/faculty/johnson/pub/OnContrast.pdf (6pp.)

A. Jacobs et al. 2D/3D Switchable Displays. Last accessed Dec. 25, 2007 at http://sharp-world.com/corporate/info/rd/tj4/pdf/4.pdf (5 pp.).

B. Girod, Human Visual Perception, EE368b Image and Video Compression. Last accessed Dec. 25, 2007 at www.stanford.edu/class/ee368b/Handouts/09-HumanPerception.pdf. (14 pp.).

J.A. Ferwerda. Fundamentals of Spatial Vision. Last accessed Dec. 25, 2007 at http://www.graphics.cornell.edu/~jaf/publications/notes_final.pdf (27 pp.).

S. Westland et al. Model of Luminance Contrast-Sensitivity Function for Application to Image Assessment. Color research and application, vol. 31, No. 4, Aug. 2006, pp. 315-319.

Digital Imaging and Communications in Medicine (DICOM) Part 14: Grayscale Standard Display Function. 1988, 16 pp. (cover, i-iii, 1-12), Nat'l Elec. Mfgrs. Assoc., Rosslyn, VA.

Winzker, M. et al. P-20: Electronic Image Correction for Electronic Displays. SID 02 Digest, pp. 272-275, May 2002, vol. 33, No. 1, pp. 272-275.

Kimpe, T. et al. Impact of defective pixels in AMLCDs on the perception of medical images. SPIE Medical Imaging 2006, Feb. 11-16 2006, San Diego, CA. 12 pp.

European Search Report in EP 07075993, completed Nov. 30, 2009. 6 pp.

T. Kimpe et al. Human vision-based algorithm to hide defective pixels in LCDs. SPIE Electronic Imaging 2006, Jan. 15-19, 2006, San Jose, CA (9 pp.).

T. Kimpe. Defective Pixels in Medical LCD Displays: Problem Analysis and Fundamental Solution. Journal of Digital Imaging, Springer New York, Jan. 2006, vol. 19, No. 1, pp. 76-84 (preprint).

T. Kimpe et al. Defective pixels in medical LCD displays: problem analysis and fundamental solution. Soc. Computer Appl. Radiology (SCAR) 2005, Jun. 2-5, 2005, Orlando, USA (poster, 1 p.).

T. Kimpe et al. Solution for Nonuniformities and Spatial Noise in Medical LCD Displays by Using Pixel-Based Correction. Journal of Digital Imaging, Springer New York, Jul. 2005, vol. 18, No. 3, pp. 209-218 (proof).

T. Kimpe et al. Solution for non-uniformities and spatial noise in medical LCD displays by using pixel-based correction. Proc. Soc. Computer Appl. Radiology (SCAR) 2004, Hot topics session, May 20-23, 2004, Vancouver, Canada (3 pp.).

T. Kimpe et al. Spatial Noise and Non-Uniformities in Medical LCD Displays: Solution and Performance Results. Proc. Soc. Info. Display/ Americas Display Eng. Appl. Conf. (SID/ADEAC) 2004, Oct. 25-27, 2004, Ft. Worth, TX (4 pp.).

T. Kimpe et al. Increasing Image Quality of Medical LCD Displays by Removing Spatial Noise and Luminance Non-uniformities. Rad. Soc. N. America (RSNA) 2004, Dec. 3, 2004, Chicago, IL. Last accessed Oct. 8, 2005 at http://rsna2004.rsna.org/rsna2004/V2004/conference/event_display.cfm?em_id=4410632 (2 pp.).

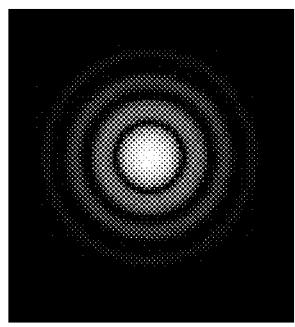 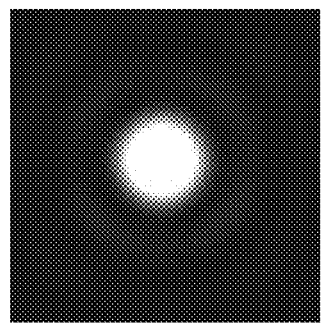 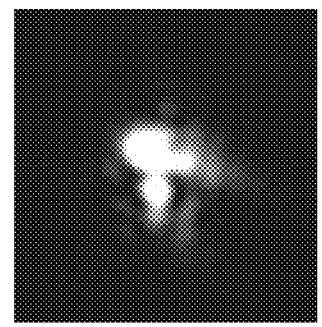
Fig. 3a    Fig. 3b    Fig. 3c
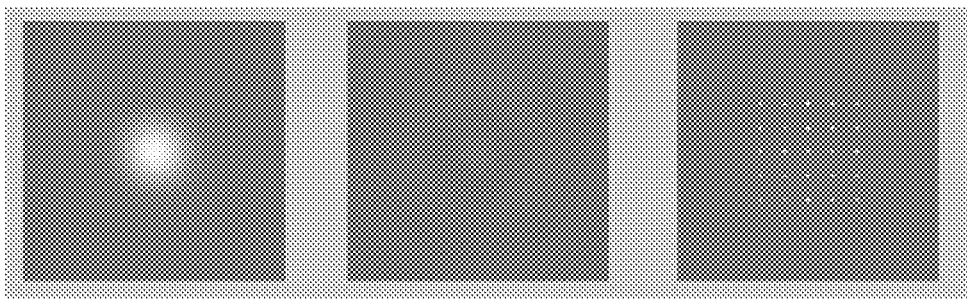
Fig. 4a    Fig. 4b    Fig. 4c
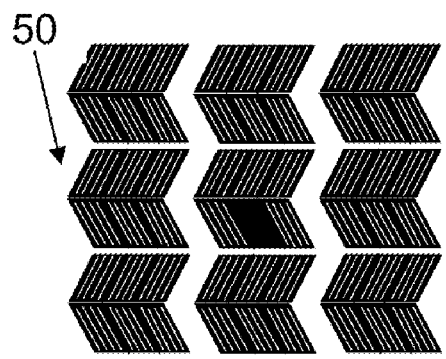 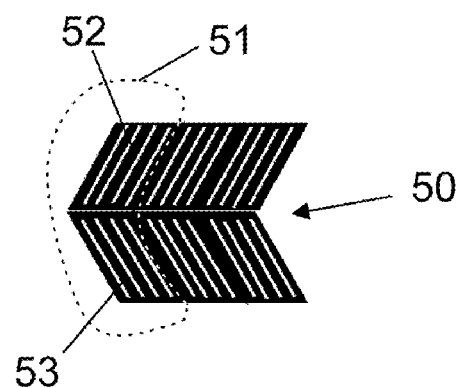
Fig. 5a    Fig. 5b

RGBRGBRG

RGBRGBRG

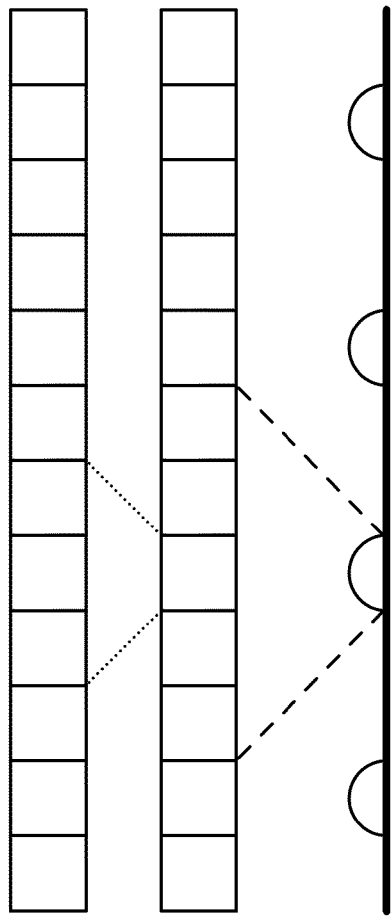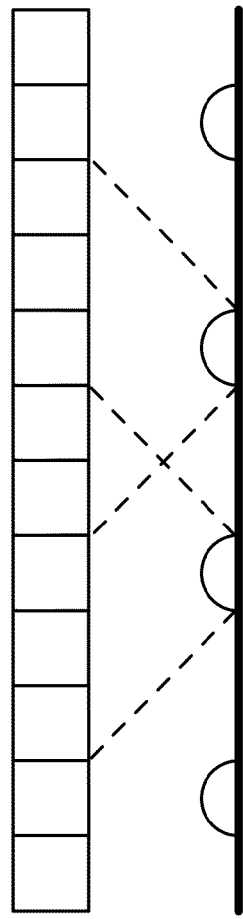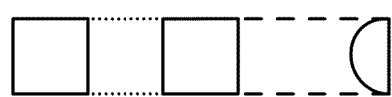

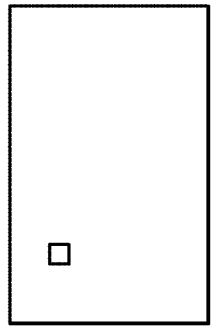
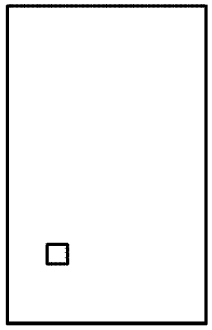
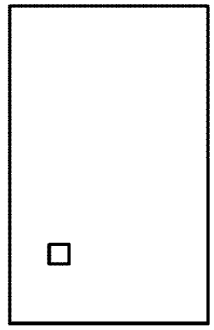
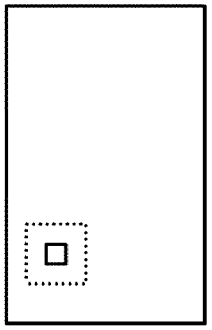
FIG. 21A — (second) compensated image ← second image
FIG. 21B — (second) compensated image ← first image
FIG. 21C — (second) compensated image ← first image
FIG. 21D — first compensated image ← second image

DISPLAY ASSEMBLIES AND COMPUTER PROGRAMS AND METHODS FOR DEFECT COMPENSATION

RELATED APPLICATIONS

This application is a divisional application of U.S. Pat. Appl. Ser. No. 11/940,593, entitled "DISPLAY ASSEMBLIES AND COMPUTER PROGRAMS AND METHODS FOR DEFECT COMPENSATION," filed Nov. 15, 2007, which application is hereby incorporated by reference and which application claims benefit of U.S. Provisional Pat. Appl. No. 60/866,431, entitled "DISPLAY ASSEMBLIES AND COMPUTER PROGRAMS AND METHODS FOR DEFECT COMPENSATION AND/OR MASKING," filed Nov. 19, 2006.

FIELD OF THE INVENTION

This invention relates to image processing.

BACKGROUND

Flat panel displays are becoming increasingly common. As display size increases, the likelihood that a display will include one or more pixel defects also increases. While a certain number of defects may be acceptable in display panels for consumer applications, pixel defects can render a costly display unusable for a demanding application such as medical imaging, air traffic control, or engineering design. The problem of coping with pixel defects will become more acute with the development of advanced display assemblies such as high-dynamic-range displays, multi-layer displays, stereoscopic displays, and autostereoscopic displays.

SUMMARY

A method for processing a display image according to an embodiment includes generating, based on the display image, a first image and a second image. This method also includes calculating, based on the second image and a map of pixel defects of a first imaging layer of a display assembly, a second compensated image. This method also includes displaying, during a first time period and on the first imaging layer, an image based on the first image and displaying, during the first time period and on a second imaging layer of the display assembly, an image based on the second compensated image.

A method for processing a display image according to another embodiment includes generating, based on the display image, a first image and a second image. This method also includes calculating, based on the first image and a map of pixel defects of a first imaging layer of a display assembly, a first compensated image. This method also includes calculating, based on the second image and the map of pixel defects of the first imaging layer, a second compensated image. This method also includes displaying, during a first time period and on the first imaging layer, an image based on the first compensated image and displaying, during the first time period and on a second imaging layer of the display assembly, an image based on the second compensated image.

A display assembly according to another embodiment includes an image generator configured to generate, based on a display image, corresponding first and second images. This apparatus also includes a first imaging layer, a map of pixel defects of the first imaging layer, and a second imaging layer. This apparatus also includes a compensation calculator configured (A) to calculate, based on the first image and the map of pixel defects, a first compensated image and (B) to calculate, based on the second image and the map of pixel defects, a second compensated image. In this apparatus, the first imaging layer is configured and arranged to display, during a first time period, an image based on the first compensated image, and the second imaging layer is configured and arranged to display, during the first time period, an image based on the second compensated image.

An apparatus for processing a display image according to another embodiment includes means for generating, based on the display image, a first image and a second image. This apparatus also includes means for calculating a first compensated image based on the first image. This apparatus also includes a map of pixel defects of a first imaging layer of a display assembly. This apparatus also includes means for calculating a second compensated image based on the second image and the map of pixel defects of the first imaging layer. This apparatus also includes means for producing, during a first time period and based on the first compensated image, a first display signal describing an image having a resolution substantially equal to that of the first imaging layer. This apparatus also includes means for producing, during the first time period and based on the second compensated image, a second display signal describing an image having a resolution substantially equal to that of a second imaging layer of the display assembly.

A computer program product according to another embodiment is stored on a machine-readable medium and includes machine-executable instructions for causing at least one array of logic elements to generate, based on a display image, a first image and a second image. This product also includes machine-executable instructions for causing at least one array of logic elements to calculate a first compensated image based on (A) the first image and (B) a map of pixel defects of a first imaging layer of a display assembly. This product also includes machine-executable instructions for causing at least one array of logic elements to calculate a second compensated image based on (A) the second image and (B) the map of pixel defects of the first imaging layer. This product also includes machine-executable instructions for causing at least one array of logic elements to produce, during a first time period and based on the first compensated image, a first display signal describing an image having a resolution substantially equal to that of the first imaging layer. This product also includes machine-executable instructions for causing at least one array of logic elements to produce, during the first time period and based on the second compensated image, a second display signal describing an image having a resolution substantially equal to that of a second imaging layer of the display assembly.

A stereoscopic display assembly according to another embodiment is configured to receive a first image and a second image and includes a display panel having a first set of pixels and a second set of pixels. This assembly also includes a map of pixel defects of the display panel and a view splitter configured to (A) pass more light from the first set of pixels in a first direction than in a second direction and (B) pass more light from the second set of pixels in the second direction than in the first direction. This assembly also includes a compensation calculator configured to calculate a compensated image based on (A) the second image and (B) the map of pixel defects. In this assembly, the display panel is configured (A) to display on the first set of pixels, during a first time period, an image based on the first image and (B) to display on the second set of pixels, during the first time period, an image based on the compensated image. In this assembly, for each of at least one defective pixel among the first set of pixels as indicated in the map of pixel defects, the compensation calculator is configured to calculate, based on a location and response of the defective pixel, a pixel value for a corresponding location of the compensated image.

A stereoscopic display assembly according to another embodiment is configured to receive a first image and a second image and includes a display panel configured and arranged (A) to display, on a first set of pixels of the display panel, an image based on the first image and (B) to display, on a second set of pixels of the display panel, an image based on the second image. This assembly also includes a map of pixel defects of the display panel and a view splitter configured (A) to pass more light from the first set of pixels in a first viewing direction than in a second viewing direction and (B) to pass more light from the second set of pixels in the second viewing direction than in the first viewing direction. This assembly also includes a controller configured to control the view splitter, based on a location and response of each of at least one defective pixel of the display panel as indicated in the map of pixel defects, to vary the proportion of light passed in the first and second viewing directions at a corresponding location of the view splitter.

BRIEF DESCRIPTION OF THE DRAWINGS

FIG. 3a illustrates an analytical point spread function (PSF) in case the optics is considered to be diffraction-limited only.

FIG. 3b and FIG. 3c illustrate numerical PSFs that are measured on test subjects.

FIG. 4a shows the eye response to a single pixel defect in the image plane if no masking is applied. FIG. 4b shows the eye response to the same pixel defect but after masking with 24 masking pixels has been applied. FIG. 4c shows the centre locations of the PSFs in the image plane of the masking pixels and the pixel defect.

FIG. 5a illustrates an array of nine pixels, each having three sub-pixels and two domains. FIG. 5b shows one of such pixels in detail.

FIG. 13A shows a backlight source and one pixel of each of two aligned panels in a two-panel display.

FIG. 13B shows a cross-section of an example of a two-panel display in which a backlight source is not perfectly collimated.

FIG. 13C shows an example of backlight sources having overlapping radiation patterns.

FIGS. 21A-D show several examples of relations among images at pixel locations that correspond visually to a hypothetical location of a defective pixel.

Figure 1A:
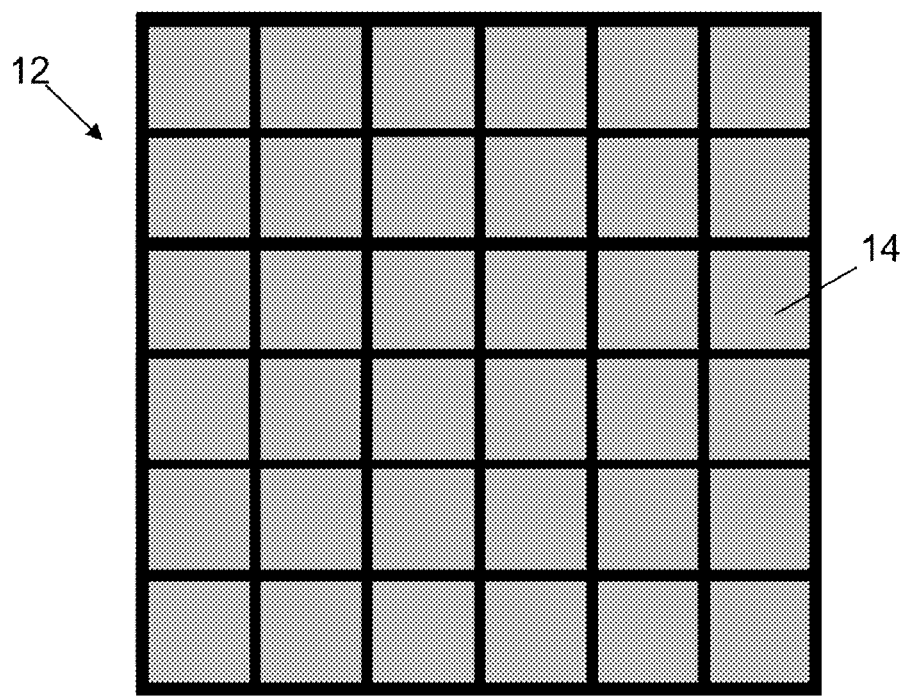
FIG. 1a illustrates a matrix display having greyscale pixels with equal luminance.

In the different figures, the same reference signs refer to the same or analogous elements.

DETAILED DESCRIPTION

The range of embodiments includes systems and methods for visual masking of pixel or sub-pixel defects present in matrix addressed electronic display devices, especially fixed format displays such as plasma displays, field emission displays, liquid crystal displays, electroluminescent (EL) displays, light emitting diode (LED) and organic light emitting diode (OLED) displays. Typical applications include flat panel displays used in projection or direct viewing concepts.

Principles disclosed herein may be applied to both monochrome and color displays and to emissive, transmissive, reflective and trans-reflective display technologies fulfilling the feature that each pixel or sub-pixel is individually addressable.

Matrix based or matrix addressed displays are composed of individual image forming elements, called display elements or picture elements (or "pixels"), that can be driven (or addressed) individually by proper driving electronics. The driving signals can switch a pixel to a first state, the on-state (at which luminance is emitted, transmitted or reflected), to a second state, the off-state (at which little or no luminance is emitted, transmitted or reflected). Examples of such operation are described in European Pat. No. 478043 (Hartmann et al.). For some displays, the driving signals can switch a pixel to one of these states or to any intermediate state between on or off (modulation of the amount of luminance emitted, transmitted or reflected). Examples of such operation are described in European Pats. Nos. 462619 (Wakita) and 478043.

Since matrix addressed displays are typically composed of many millions of pixels, very often pixels exist that are stuck in a certain state (on, off or anything in between) regardless of the value of the signal driving that pixel. Where pixel elements comprise multiple sub-pixels, individually controllable or not, then one or more of the sub-pixel elements may become stuck in a certain state. For example, a pixel structure may comprise three sub-pixel elements for red, green and blue colors respectively. If one of these sub-pixel elements becomes stuck in a certain state, then the pixel structure will have a permanent color shift. Mostly such problems are due to a malfunction in the driving electronics of the individual pixel (for instance, a defective transistor). Other possible causes are problems with various production processes involved in the manufacturing of the displays, and/or by the physical construction of these displays, depending on the type of technology of the electronic display under consideration.

It is also possible that a pixel or sub-pixel element is not really stuck in a state, but nevertheless shows a luminance or color behavior that is significantly different from the pixels or sub-pixels in its neighborhood. In some illustrative but non-limiting examples, a defective pixel shows a luminance behavior that differs more than 20% (at one or more video levels) from the pixels in its neighborhood, or a defective pixel shows a dynamic range (maximum luminance/minimum luminance) that differs more than 15% from the dynamic range of pixels in its neighborhood, or a defective pixel shows a color shift greater than a certain value comparing to an average or desired value for the display. Of course other rules are possible to determine whether a pixel or sub-pixel is defective or not, and any condition that has a potential danger for image misinterpretation can be expressed in a rule to determine whether a pixel is a defective pixel. Bright or dark spots due to dust for example may also be considered as pixel defects. A pixel defect may be described as an additive error (as the driving signal changes, the brightness of the pixel exceeds or falls below the proper level by a substantially constant amount), as a multiplicative error (as the driving signal changes, the brightness of the pixel exceeds or falls below the proper level according to a substantially constant factor), as a nonlinear error (as the driving signal changes, the brightness of the pixel exceeds or falls below the proper level according to a nonlinear relation, such as an exponential and/or logarithmic relation), as a limit error (as the driving signal changes, the brightness of the pixel will not rise above and/or fall below some level), or as some combination of such errors.

Defective pixels or sub-pixels are typically very visible for the user of the display. They result in a significantly lower (subjective) image quality and can be very annoying or disturbing for the display-user. For demanding applications (such as medical imaging, in particular mammography) the defective pixels or sub-pixels can even make the display unusable for the intended application, as it can result in an incorrect interpretation of the image being displayed. For applications where image fidelity is required to be high, such as for example in medical applications, this situation is unacceptable.

U.S. Pat. No. 5,504,504 describes a method and display system for reducing the visual impact of defects present in an image display. The display includes an array of pixels, each non-defective pixel being selectively operable in response to input data by addressing facilities between an "on" state, whereat light is directed onto a viewing surface, and an "off" state, whereat light is not directed onto the viewing surface. Each defective pixel is immediately surrounded by a first ring of compensation pixels adjacent to the central defective pixel. The compensation pixels are immediately surrounded by a second ring of reference pixels spaced from the central defective pixel. The addressing circuit-determined value of at least one compensation pixel in the first ring surrounding the defective pixel is changed from its desired or intended value to a corrective value, in order to reduce the visual impact of the defect. In one embodiment, the value of the compensation pixels is selected such that the average visually defected value for all of the compensation pixels and the defective pixel is equal to the intended value of the defective pixel. In another embodiment, the values of the compensation pixels are adjusted by adding an offset to the desired value of each compensation pixel. The offset is chosen such that the sum of the offset values is equal to the intended value of the defective pixel. One potential disadvantage of the solution proposed in U.S. Pat. No. 5,504,504 is that a trial and error method is required for every other display in order to obtain a reasonable correction result.

The range of embodiments includes methods and devices for making pixel defects less visible and thus avoiding wrong image interpretation. The range includes methods usable for different types of matrix displays without a trial and error method being required to obtain acceptable correction results.

One general example of a method for reducing the visual impact of defects present in a matrix display comprising a plurality of display elements (i.e., pixels) includes acts of providing a representation of a human vision system; characterizing at least one defect present in the display, the defect being surrounded by a plurality of non-defective display elements; deriving drive signals for at least some of the plurality of non-defective display elements in accordance with the representation of the human vision system and the characterizing of the at least one defect, to thereby minimize an expected response of the human vision system to the defect; and driving at least some of the plurality of non-defective display elements with the derived drive signals.

Minimizing the response of the human vision system to the defect may comprise changing the light output value of at least one non-defective display element surrounding the defect in the display. Characterizing at least one defect present in the display may comprise storing a map of pixel defects of the display. Such a map may include characterization data characterizing the location and non-linear light output response of individual display elements, the characterization data representing light outputs of an individual display element as a function of its drive signals.

Such a method may also include generating the characterization data from images captured from individual display elements. Generating the characterization data may comprise building a display element profile map representing characterization data for each display element of the display.

Providing a representation of the human vision system may comprise calculating an expected response of a human eye to a stimulus applied to a display element. For calculating the expected response of a human eye to a stimulus applied to a display element, use may be made of a point spread function (PSF) of the eye. The PSF may be described analytically, for example based on using any of Taylor, Seidel or Zernike polynomials, or the PSF may be described numerically.

Some such methods are configured to take boundary conditions into account when minimizing the response of the human vision system to the defect. Minimizing the response of the human vision system may be carried out in real-time or off-line. A defect may be caused by a defective display element or by an external cause, such as dust adhering on or between display elements for example.

One general example of a system for reducing the visual impact of defects present in a matrix display comprising a plurality of display elements and intended to be looked at by a human vision system is described as follows. First characterization data for a human vision system is provided, and the system includes a defect characterizing device for generating second characterization data for at least one defect present in the display, the defect being surrounded by a plurality of non-defective display elements; a compensation device for deriving drive signals for at least some of the plurality of non-defective display elements in accordance with the first characterization data and the second characterizing data, to thereby minimize an expected response of the human vision system to the defect; and means for driving at least some of the plurality of non-defective display elements with the derived drive signals.

The compensation device may comprise means to change the light output value of at least one non-defective display element surrounding the defect in the display. The defect characterizing device may comprise an image capturing device for generating an image of the display elements of the display. The defect characterizing device may also comprise a display element location identifying device for identifying the actual location of individual display elements of the display. In such a system, for providing the first characterization data, a vision characterizing device having calculating means for calculating the response of a human eye to a stimulus applied to a display element may be provided.

One general example of a matrix display device for displaying an image intended to be looked at by a human vision system includes a plurality of display elements; a first memory for storing first characterization data for a human vision system; a second memory for storing second characterization data for at least one defect present in the display device (e.g., a map of pixel defects); and a modulation device for modulating, in accordance with the first characterization data and the second characterization data, drive signals for non-defective display elements surrounding the defect so as to reduce the visual impact of the defect present in the matrix display device. In such a matrix display device, the first and the second memory may physically be a same memory device.

One general example of a control unit for use with a system for reducing the visual impact of defects present in a matrix display comprising a plurality of display elements and intended to be looked at by a human vision system is described as follows. In this example, the control unit includes a first memory for storing first characterization data for a human vision system; a second memory for storing second characterization data for at least one defect present in the display (e.g., a map of pixel defects); and modulating means for modulating, in accordance with the first characterization data and the second characterization data, drive signals for non-defective display elements surrounding the defect so as to reduce the visual impact of the defect.

In many cases, such arrangements may be applied to solve the problem of defective pixels and/or sub-pixels in matrix displays by making them almost invisible for the human eye under normal usage circumstances. Such an effect may be achieved by changing the drive signal of non-defective pixels and/or sub-pixels in the neighborhood of the defective pixel or sub-pixel.

In this description, the pixels or sub-pixels that are used to mask the defective pixel are called "masking elements" and the defective pixel or sub-pixel itself is called "the defect". By a defective pixel or sub-pixel is meant a pixel that always shows the same luminance, i.e. a pixel or sub-pixel stuck in a specific state (for instance, but not limited to, always black, or always full white) and/or color behavior independent of the drive stimulus applied to it, or a pixel or sub-pixel that shows a luminance or color behavior that is significantly distorted compared to non-defective pixels or sub-pixels of the display. For example, a pixel that reacts to an applied drive signal, but that has a luminance behavior that is very different from the luminance behavior of neighboring pixels (for instance, significantly more dark or bright than surrounding pixels) can be considered a defective pixel. By visually masking is meant minimizing the visibility and negative effects of the defect for the user of the display.

In this description and the claims that follow, the term "defect compensation" includes defect correction, in which a defective pixel or sub-pixel is driven to obtain the same visual result as if the pixel were not defective, and defect masking, in which one or more other pixels and/or subpixels are driven in order to reduce the visibility of a defective pixel or sub-pixel without actually correcting it. In this description and the claims that follow, the term "pixel" is used generally to refer to pixels and subpixels, unless the context explicitly indicates that the term is being used to describe a pixel and not a subpixel.

The disclosure includes a mathematical model that may be used to calculate an optimal driving signal for the masking elements in order to minimize the visibility of the defect(s). The same algorithm can be adapted for use with different display configurations because it includes some parameters that describe display characteristics. A mathematical model based on the characteristics of the human eye is used to calculate optimal drive signals of the masking elements. The model describes algorithms to calculate the actual response of the human eye to the superposition of the stimulus applied (in this case, to the defect and to the masking pixels). In this way, the optimal drive signals of the masking elements can be described as a mathematical minimization problem of a function with one or more variables. It is possible to add one or more boundary conditions to this minimization problem. Examples when extra boundary conditions may be desirable include in case of defects of one or more masking elements, limitations to the possible drive signal of the masking elements, dependencies in the drive signals of masking elements, etc.

The scope of the disclosure includes methods that may be used to correct defective pixels, as well as methods that do not repair the defective pixels but rather may be used to mask them to make the defects less visible, perhaps nearly invisible, and thus may help to avoid an incorrect image interpretation.

Although particular illustrative embodiments are described herein with reference to certain drawings, the scope of the disclosure is not limited thereto. The drawings described are only schematic and are non-limiting. In the drawings, the size of some of the elements may be exaggerated and not drawn on scale for illustrative purposes. Where the term "comprising" is used in the present description and claims, it does not exclude other elements or operations. Unless expressly limited by its context, the term "generating"

is used herein to indicate any of its ordinary meanings, such as computing or otherwise producing. Unless expressly limited by its context, the term "calculating" is used herein to indicate any of its ordinary meanings, such as computing, evaluating, and/or selecting from a set of values. Unless expressly limited by its context, the term "obtaining" is used to indicate any of its ordinary meanings, such as calculating, deriving, receiving (e.g., from an external device), and/or retrieving (e.g., from an array of storage elements). The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B").

In the present description, the terms "horizontal" and "vertical" are used to provide a co-ordinate system and for ease of explanation only. They refer to a co-ordinate system with two orthogonal directions which are conveniently referred to as vertical and horizontal directions. They do not need to, but may, refer to an actual physical direction of a device. In particular, horizontal and vertical are equivalent and interchangeable by means of a simple rotation through an odd multiple of 90°.

A matrix addressed display comprises individual pixels. The pixels, either themselves or in groupings, are individually addressable to thereby display or project an arbitrary image. In the present description, the term "pixel" is to be understood to comprise any form of element which modulates a light output, e.g. an element that emits light or through which light is passed or from which light is reflected. The term "display" includes a projector. A pixel may therefore be an individually addressable element of an emissive, transmissive, reflective or trans-reflective display, especially a fixed format display. The term "fixed format" relates to the fact that an area of any image to be displayed or projected is associated with a certain portion of the display or projector, e.g. in a one-to-one relationship. Pixels may be individual elements (e.g., as in a greyscale LCD) or may include sub-pixels, as in a plurality of sub-pixels forming one pixel. For example, three sub-pixels with a different color, such as a red sub-pixel, a green sub-pixel and a blue sub-pixel, may together form one pixel in a color display such as an LCD. Whenever the word pixel is used, it is to be understood that the same may hold for sub-pixels, unless the contrary is explicitly indicated. Unless otherwise noted, the term "image" indicates an ordered array of pixel values (e.g., a signal describing such an array) that represents a two-dimensional picture.

While certain inventive principles are described with reference to flat panel displays, the scope of the disclosure is not limited thereto. It is also understood that a flat panel display does not have to be exactly flat, and that the term "flat panel display" also includes shaped or bent (e.g., curved) panels. A flat panel display differs from a display such as a cathode ray tube in that it comprises a matrix or array of pixels, each producing or controlling light over a small area. Arrays of this kind are called fixed format arrays. There is a relationship between a pixel value of an image to be displayed and a pixel of the display. Usually this is a one-to-one (e.g., monochrome) or several-to-one (e.g., color) relationship. In some cases, each pixel of the display may be addressed and driven separately. Applicability of the general inventive principles is not limited to whether the flat panel displays are active or passive matrix devices. The array of pixels is usually in rows and columns but the present disclosure is not limited thereto and may include any arrangement (e.g., polar or hexagonal). Inventive principles will mainly be described with respect to liquid crystal displays, but in general such principles are more widely applicable to flat panel displays of different types, such as plasma displays, field emission displays, EL-displays, OLED displays etc. In particular, such principles may be applied not only to displays having an array of light emitting elements but also to displays having arrays of light emitting devices, whereby each device is made up of a number of individual elements. The displays may be emissive, transmissive, reflective, or trans-reflective displays.

Further the method of addressing and driving the pixel elements of an array is not considered a limitation on the general applicability of the inventive principles. Typically, each pixel element is addressed by means of wiring, but other methods are known such as plasma discharge addressing (e.g., as disclosed in U.S. Pat. No. 6,089,739) and CRT addressing.

Figure 1B:
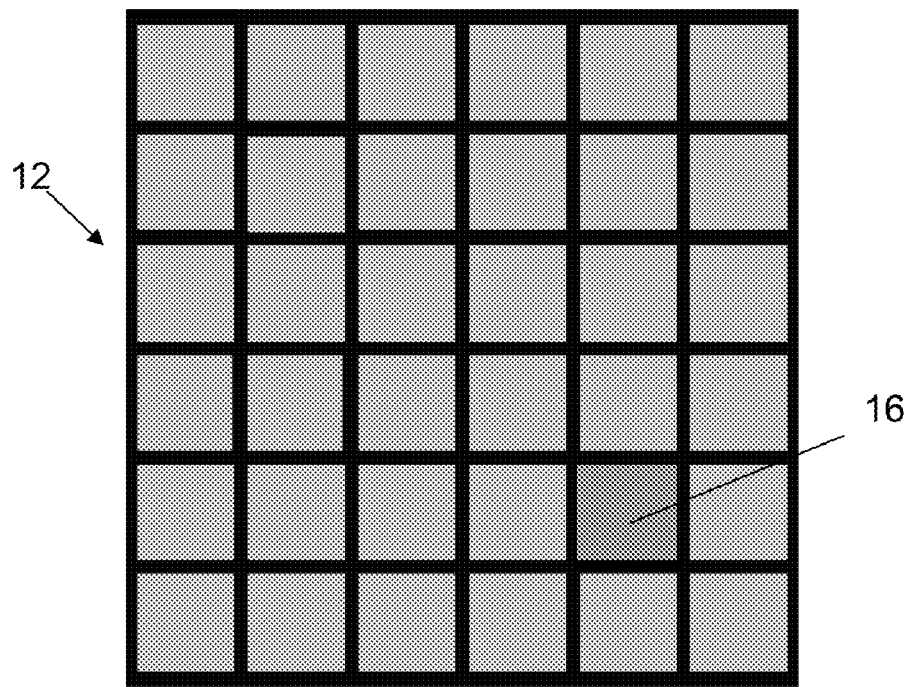
FIG. 1b illustrates a matrix display having greyscale pixels with unequal luminance.

A matrix addressed display 12 comprises individual pixels 14. The examples of matrix displays 12 as shown in FIGS. 1a to 2b have rectangular or square pixels 14 arranged in horizontal rows and vertical columns, although other shapes and/or arrangements are possible. FIG. 1a illustrates an image of an ideal display 12 that has equal luminance response in all pixels 14 when equally driven. In such case, every pixel 14 driven with the same signal renders the same luminance. In contrast, FIG. 1b illustrates an image of a display 12 where the pixels 14 of the display 12 are also driven by equal signals, but where the pixels 14 render a different luminance, as can be seen by the different grey values. Pixel 16 in the display 12 of FIG. 1b is a defective pixel. FIG. 1b shows a monochrome pixel structure with one defective pixel 16 that is always in an intermediate pixel state.

Figure 2A:
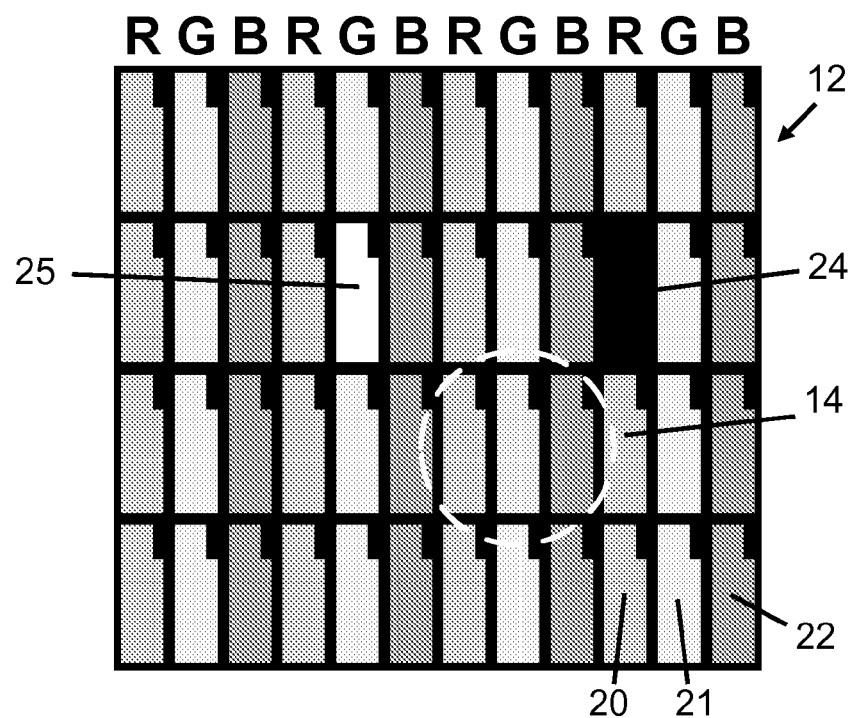
FIG. 2a illustrates an LCD display having an RGB-stripe pixel arrangement: one pixel comprises three colored sub-pixels in stripe ordering, and the display has a defective green sub-pixel that is always fully on, and a defective red sub-pixel that is always off.

FIG. 2a shows a typical RGB-stripe pixel arrangement of a color LCD display 12: one pixel 14 consists of three colored sub-pixels 20, 21, 22 in stripe ordering, where the labels R (for red), G (for green), and B (for blue) indicate the color of each stripe. These three sub-pixels 20, 21, 22 are driven individually to generate color images. In FIG. 2a there are two defective sub-pixels present: a defective red sub-pixel 24 that is always off and a defective green sub-pixel 25 that is always fully on.

Figure 2B:
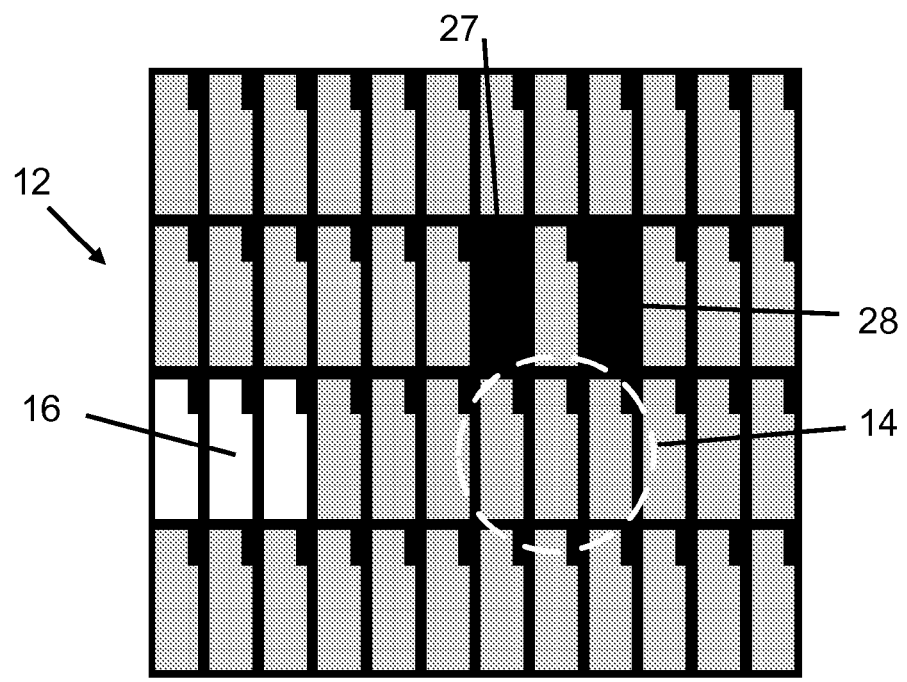
FIG. 2b illustrates a greyscale LCD based matrix display having unequal luminance in sub-pixels.

FIG. 2b shows an asymmetric pixel structure that is often used for high-resolution monochrome displays. In FIG. 2b, one monochrome pixel 14 consists of three monochrome sub-pixels. Depending on the panel type and driving electronics, the three sub-pixels of one pixel are driven as a unit or individually. FIG. 2b shows 3 pixel defects: a complete defective pixel 16 in "always on" state and two defective sub-pixels 27, 28 in "always off" state that happen to be located in a same pixel 14.

The spatial distribution of the luminance differences of the pixels 14 can be arbitrary. It is also found that with many technologies, this distribution changes as a function of the applied drive to the pixels, indicating different response relationships for the pixels 14. For a low drive signal leading to low luminance, the spatial distribution pattern can differ from the pattern at higher driving signal.

The optical system of the eye, in particular the human eye, comprises three main components: the cornea, the iris and the lens. The cornea is the transparent outer surface of the eye. The iris alters the size of the pupil to limit the amount of light that reaches the retina and thus changes the numerical aperture of the optical system of the eye. By applying tension to the lens, the eye is able to focus on both nearby and far away objects. The optical system of the eye is very complex but the process of image transmission through this system can be approximated by using a "black-box" approach. The behavior of the black box can be described by the complex pupil function (CPF):

$$CPF(x,y)=P(x,y)\cdot\exp[-ikW(x,y)],$$

where i denotes $\sqrt{-1}$, $k=2\pi/\lambda$ is the wave number, and $\lambda$ is the wavelength of the light. The complex pupil function includes two components: an amplitude component P(x,y) which defines the shape, size and transmission of the black box; and a phase component including a wave aberration W(x,y) which defines how the phase of the light has changed after passing through the black box. Other expressions of the CPF are also known, and the range of embodiments is not limited by any particular such expression.

It is common practice in vision applications to describe the wave aberration W(x,y) mathematically by means of a set of polynomials. Often Seidel polynomials are used, but also Taylor polynomials and Zernike polynomials are common choices. Especially Zernike polynomials have interesting properties that make wave aberration analysis much easier. Often unknown wave aberrations are approximated by Zernike polynomials; in such case, the coefficients of the polynomials are typically determined by performing a least-square fit.

Once the nature of the light transmitted by the eye's optical system is known or modeled, the image formation process can be described by a transfer function that models a response of a human visual system (HVS). For example, the transfer function may model the projection of a given visual stimulus on the retina. Most lenses, including the human lens, are not perfect optical systems. As a result, when visual stimuli are passed through the cornea and lens, the stimuli undergo a certain degree of degradation or distortion.

Transfer functions that may be used to model the HVS response include the 'Pupil Function (or aberration)', the 'Point Spread Function (PSF)', the 'Line Spread Function (LSF)', the 'Contrast Transfer Function (CTF)', the 'Optical Transfer Function (OTF)', the 'Modulation Transfer Function (MTF)' and 'Phase Transfer Function (PTF)'. Clear mathematical relations exist between all these representation-methods so that it is possible to transform one form into another form. For example, the OTF is the Fourier transform of the PSF, and it is also the product of the MTF and PTF. Expression of such a modeling transfer function may be done analytically (for instance but not limited to a mathematical function in Cartesian or polar co-ordinates, by means of standard polynomials, or by means of any other suitable analytical method) or numerically by describing the function value at certain points. For convenience, use of the PSF is described below, but it is expressly contemplated and hereby disclosed that any of the transfer functions identified above may be used, as well as any other model of the HVS response.

The degradation or distortion of the visual stimuli can be represented by projecting an exceedingly small dot of light, a point, through a lens. The image of this point will not be the same as the original because the lens will introduce a small amount of blur. The PSF describes the image of a point source formed by the black box. The PSF of the eye can be calculated using the Fraunhofer approximation:

$$PSF(x',y')=K\cdot|F\{CPF(x,y)\}|^2$$

where (x',y') denotes a coordinate system of the image plane, (x,y) denotes a coordinate system of the object plane, F denotes the two-dimensional Fourier transform, K is a constant, and | | represents the magnitude-operator. The image-plane and object-plane coordinate systems are related as (x', y')=(Gx,Gy), where M is a magnification constant that depends upon, for example, the object distance. Other expressions of the PSF are also known, and the range of embodiments is not limited by any particular such expression.

In the case of the human eye, the PSF describes the image of a point source on the retina. To describe a complete object, one can think of the object as a combination or a matrix of a potentially exceedingly large or even infinite number of point sources. Each of these point sources is then projected on the retina as described by the same PSF (this approximation is strictly only valid if the object is small and composed of a single wavelength). Mathematically this can be described by means of a convolution:

$$I(x',y')=PSF \otimes O(x',y'),$$

where O(x',y') is the object representation at the image-plane and I(x',y') is the resulting image on the retina. Typically this convolution will be computed in the Fourier domain by multiplying the Fourier transforms of both the PSF and the object and then applying the inverse Fourier transform to the result.

FIG. 3a shows an analytical PSF for a case in which the optics is considered to be diffraction-limited only. It is to be noted that the PSF is clearly not a single point, i.e. that the image of a point source is not a point. The central zone of the diffraction-limited PSF is called an Airy disc. FIGS. 3b and 3c show (numerical) PSFs that were measured on test subjects. Here again it can be seen that the PSF is not a point.

Based on the PSF or other model of the HVS response, the response or expected response of the eye to a defective pixel can be mathematically described. Therefore the defective pixel is treated as a point source with an "error luminance" value that is dependent on the defect itself and may also be dependent on the image data that should be displayed at the defect location at that time. For instance if the defective pixel is driven to have luminance value 23, but due to the defect it outputs luminance value 3, then this defect is treated as a point source with error luminance value −20. It is to be noted that this error luminance value can have both a positive and a negative value. Supposing that some time later this same defective pixel is driven to show luminance value 1, but due to the defect it still shows luminance value 3. Then this same defective pixel will be treated as a point source with error luminance value +2.

As described above, this point source with a specific error luminance value will result in a response of the eye as described by the PSF or other model of the HVS response. Because this response is typically not a single point, it is possible to use pixels and/or subpixels in the neighborhood of the defective pixel to provide some image improvement. These neighboring pixels are called masking pixels and can be driven in such a way as to minimize the response of the eye to the defective pixel. This effect may be achieved by changing the drive signal of the masking pixels such that the superposition of the image of the masking pixels and the image of the defective pixel results in a lower or minimal response of the human eye. Calculation of the masking values to be superposed may be expressed by a minimization operation such as the following:

$$[C_1, C_2, \ldots, C_n] = \underset{C_1, C_2, \ldots, C_n}{\operatorname{argmin}} \int_{-\infty}^{+\infty}\int_{-\infty}^{+\infty} f(v, x', y') dx' dy' \quad (1)$$

where $C_1, C_2, \ldots, C_n$ are the masking luminance values to be superposed on the masking pixels $M_1, M_2, \ldots, M_n$ with relative locations $(x_1,y_1), (x_2,y_2), \ldots, (x_n,y_n)$ in order to obtain minimal eye response to the defect. The cost function $f(v,x',y')$ calculates a "penalty" value from the eye response at location (x',y'). Examples of $f(v,x',y')$ include $v^2$, $|v|$ and $v^2/\sqrt{(x')^2+(y')^2}$, although the cost function $f$ is not limited to these examples.

It is to be noted that the Cartesian coordinate system (x',y') is defined in the image plane on the retina, with origin being the centre of the image of the defect as described by the model of the HVS response (e.g., the center of the PSF of the defect PSF(x',y')). As noted above, the Cartesian co-ordinate system (x,y) is defined in the object plane of the display, and $(x_i,y_i)$ denotes the location of masking pixel i relative to the defect. The relation between these two co-ordinate systems may be expressed as (x',y')=(Gx,Gy), where G is a constant that defines the magnification in the image plane and whose value may depend on, among other factors, the object distance.

Various forms may be adopted for the superposition function v. For a case in which the neighborhood includes only one defect to be masked, the function v may be expressed as $$v = E \times PSF(x', y') + \left[\sum_{i=1}^{n} C_i \times PSF(x' - x'_i, y' - y'_i)\right] \quad (2)$$

where E indicates the error luminance value of the defect, (x',y') indicates the location of the image of the defect, n indicates the number of masking pixels, and (x',y') indicates the location of the image of masking pixel i.

In another case, multiple defects may occur within a small area, the small area being the area that contains all masking pixels for one particular defect. In this case it might not be possible to assign the required value to all masking pixels. In one such example, the mathematical description is restated such that one of the defects is chosen as the centre of both the image plane and object plane co-ordinate systems. The algorithm may then be arranged to minimize the total response to all the defects and all used masking pixels in this area. For example, the superposition function v may be expressed as $$v = \left[\sum_{i=1}^{n} C_i \times PSF(x' - x'_i, y' - y'_i)\right] + \\ E_1 \times PSF(x', y') + \left[\sum_{j=2}^{m} E_j \times PSF(x' - ex'_j, y' - ey'_j)\right] \quad (3)$$

where the selected defect 1 is at location (x',y'), m indicates the number of defects, $E_j$ indicates the error luminance value of defect j, and $(ex'_j, ey'_j)$ indicates the location of the image of defect j.

As the response of each HVS may be different, defect compensation according to a method as described herein can be made user specific by using one or more response models (e.g., PSFs) which are specific for that user.

FIG. 4a shows the eye response to a single defective pixel in the image plane if no masking is applied. FIG. 4b shows the eye response to the same defective pixel but after masking using 24 masking pixels (neighbors of the defective pixel) has been applied. FIG. 4c shows the centre locations of the PSFs in the image plane of the masking pixels and the defective pixel (central point). These simulations have been performed with the diffraction-limited PSF and the minimization was done numerically by using a least square error method.

It may be desirable to simplify computation by assuming that the viewer's eye is free of aberration and can be described using a diffraction-limited PSF. The PSF of a diffraction-limited optical system may be expressed in polar co-ordinates as follows:

$$PSF(r') = 2\left[\frac{J1(r')}{r'}\right]^2, \quad (4)$$

where J1 is the Bessel function of the first kind and r' is given by $$r' = \frac{\pi D}{\lambda f} \cdot r,$$

where D is the aperture diameter, $f$ is the focal length, and $\lambda$ is the wavelength of the light. Such a PSF may be used in place of PSF (x',y'), e.g. in a superposition function v as described herein.

Typically the PSF of the eye is dependent on the pupil diameter. For example, the diffraction-limited PSF becomes wider as pupil diameter decreases. Therefore, it may be desirable to vary the PSF locally according to the level of luminance at a corresponding pixel location or neighborhood. For example, an improvement could be to adapt the PSF (and/or other model of the HVS response) used for the minimization calculation, based on the average luminance value of the display or some part of the display such as the neighborhood of the defect and/or the average luminance value of the environment.

To simplify calculation of the minimization operation, some changes to the algorithm can be made. A first possible change is to restrict the integration in expression (1) to a limited area around the defect. Such restriction is possible because the result of the cost function $f$ (and the value of an HVS response model, such as the PSF) typically decreases very fast with increasing distance from the defect. If symmetric models (e.g., symmetric PSFs) are used or if the pixel structure is symmetrical, then it is often possible to apply some boundary conditions to the masking values of the masking pixels. For example, in case of a point symmetric pixel structure, a point-symmetric PSF may be used such that the calculated masking values for the masking pixels will show point symmetry also.

Another possible change is to approximate the integration over a certain area as a summation over particular points in that area. Such a technique is generally used in mathematics. If calculation time is very important, then the two-dimensional minimization problem can be transformed or approximated into a one-dimensional problem (for example, by transforming or approximating a two-dimensional model such as PSF(x',y') by a one-dimensional version such as PSF (r')).

For a case in which the cost function $f$ is expressed as $v^2$, expression (1) may be simplified as a summation over some range of x' and y' as follows:

$$[C_1, C_2, \ldots, C_n] = \underset{C_1, C_2, \ldots, C_n}{\operatorname{argmin}} \sum_{y'} \sum_{x'} \quad (5)$$

$$\left(E \times PSF(x', y') + \left[\sum_{i=1}^{n} C_i \times PSF(x' - x'_i, y' - y'_i)\right]\right)^2.$$

In the following particular example of expression (5), the set of compensation pixels is limited to a 3×3 neighborhood of the defect, and the range of each PSF is limited to a 3×3 neighborhood of the pixel:

$$[C_1, C_2, \ldots, C_n] = \operatorname*{argmin}_{C_1, C_2, \ldots, C_n} \sum_{y'=-1}^{1} \sum_{x'=-1}^{1} \left( E \times PSF(x', y') + \left[ \sum_{v=-1}^{1} \sum_{u=-1}^{1} C_{uv} \times PSF(x'-u, y'-v) \right] \right)^2. \quad (6)$$

In the following example, the set of compensation pixels in expression (6) is extended to include a 5×5 neighborhood of the defect:

$$[C_1, C_2, \ldots, C_n] = \operatorname*{argmin}_{C_1, C_2, \ldots, C_n} \sum_{y'=-1}^{1} \sum_{x'=-1}^{1} \left( E \times PSF(x', y') + \left[ \sum_{v=-2}^{2} \sum_{u=-2}^{2} C_{uv} \times PSF(x'-u, y'-v) \right] \right)^2. \quad (7)$$

In general, the inventive principles are not limited to any particular co-ordinate system such as the Cartesian co-ordinate system as used above; other systems are also possible, for instance, but not limited to, a polar co-ordinate system.

As described by way of example above, the problem of finding an optimal masking luminance of the masking pixels may be translated into a well-understood minimization problem. It is to be noted that this mathematical description is very general: it does not impose any limitation on the number of masking pixels nor on the location of these masking pixels. The pixels also do not need to be located in any particular pixel structure: the algorithm can handle all possible pixel organizations. Also the defect itself is not necessarily located at a pixel location: for example, some dust between two pixels can cause a permanent bright spot.

The algorithm above describes a general method to calculate optimal luminance values for masking pixels in order to minimize the eye response to the defect. In practice, however, some special situations exist for which additions to the described algorithm may be desirable.

A first special situation is when the pixels cannot be driven individually, but are rather driven in groups. High-resolution monochrome LCDs, for example, often have a pixel structure in which one monochrome pixel consists of three monochrome sub-pixels that are equally and simultaneously driven, as illustrated in FIG. 2b. In such a situation, it may be desirable to apply a boundary condition, corresponding to the driving method, to the minimization problem to be solved. In the case of three equally and simultaneously driven sub-pixels, for example, it may be desirable for the boundary condition to state that the masking values of each of the simultaneously driven sub-pixels within a same pixel should have a same value.

A second special situation occurs when pixels have a limited driving range. It is possible, for example, that the above-described minimization algorithm would result in a required luminance value for a masking pixel that lies outside of the luminance range of the pixel. Introducing a boundary condition that limits the driving value of all pixels solves this problem of an invalid value. Such type of boundary condition can be stated as:

$LL \leq (\text{Pixel value} + \text{masking value}) \leq UL$ which condition may be applied to all masking pixels. In this expression, LL indicates the lower driving limit of the pixels, UL indicates the upper driving limit, "Pixel value" indicates the normal (uncompensated) pixel value of the pixel, and "masking value" indicates the calculated value to be superposed on that masking pixel. It may be desirable to use different values of LL and/or UL for different groups of pixels (e.g., depending on a desired average luminance over the group and/or a luminance value of a neighboring area in another imaging layer of the display as described herein).

Furthermore, the requirement that the final driving value of the masking pixel should be an integer can be a boundary condition to be used.

Another special situation occurs when pixels (or defects) are larger so that they cannot be modeled anymore by a point source. One potential solution is to model the defect as a (possibly infinite) number of point sources. A dual domain in-plane switching (IPS) LCD panel, for example, has pixels that include two domains. Such pixels can be modeled by two or more point sources that do not have necessarily the same luminance value. FIG. 5a shows an array of nine pixels 50, each having three sub-pixels 51 and each sub-pixel 51 having two domains 52, 53. FIG. 5b shows one pixel 50 in detail. In this situation it may be desirable to treat each pixel 50 as a superposition of six point sources. If the pixel 50 can only be driven as a unit, it may be desirable to add a boundary condition stating that the six masking values of each pixel 50 should be equal.

Figure 6:
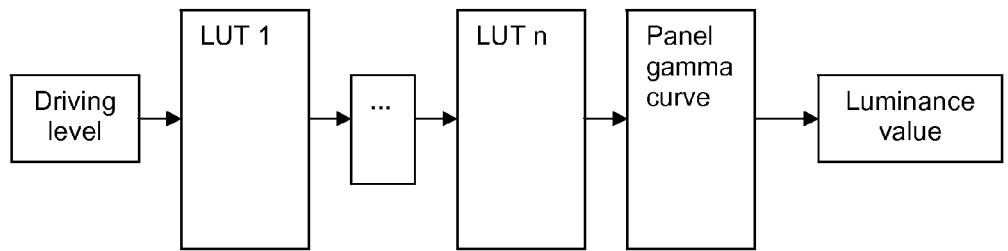
FIG. 6 illustrates a transformation from a driving level to a luminance level.

The algorithms above are described in terms of luminance values and not driving values. In a typical display, however, the relation between a driving level of a pixel and the resulting luminance value is nonlinear, primarily due to the nonlinear response of the display panel. Therefore, in a realistic display system, the calculated luminance adjustment should be transformed into a corresponding drive level adjustment. A display system typically includes one or more look-up tables (LUTs) that are used to process the driving signals in order to compensate the nonlinear response of a display panel, which may be characterized by a specific gamma curve. For example, the display system may include a display signal generator configured to use one or more such LUTs to convert a display image to a gamma-compensated image having at least substantially the same spatial resolution. In such cases, a conversion from luminance value to driving value may be performed in a straightforward manner by applying the inverse operations. It is to be noted that depending on the particular location at which the compensation will be applied, the LUT inversion may or may not be necessary. FIG. 6 shows a typical transformation from driving level to the resulting luminance level. For cases in which the conversion between driving level of a pixel and resulting luminance value may be modeled adequately, the algorithms herein (e.g., expression (1) and variations thereof) may be configured to include conversion of a calculated masking luminance value to a corresponding driving level adjustment.

Figure 9:
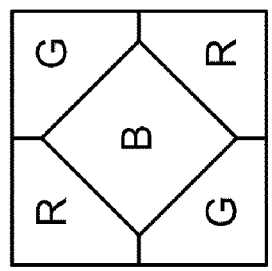
FIG. 9 shows eight different examples of subpixel geometries that may be used in a color display panel.

The examples described above relate to monochrome displays. For defect compensation in color displays, any of the following three extensions may be used. (FIG. 9 shows eight different examples of subpixel geometries that may be used in a color display panel, where R, G, B, W, C, M, Y denote red, green, blue, white, cyan, magenta, and yellow.)

A first extension is to use only masking sub-pixels of the same color as the defective sub-pixel. This method is simple, but can introduce visible color shifts since the color value of the defective pixel and the masking pixels can change.

Therefore, a second extension is proposed, according to which artificial defects are introduced such that the color points or color co-ordinates of the defective pixel and the masking pixels change only a little or do not change at all. Suppose, for example, that in a color panel with RGB sub-pixels, a particular R sub-pixel is defective such that the color point of that pixel is incorrect. An implementation of this second extension may be applied to introduce an artificial G- and/or B-defective sub-pixel, such that the color point or color coordinates of the defective pixel remain correct as much as possible, even though the luminance value may be incorrect. It is to be noted that it is not always possible to correct the color point completely with the remaining sub-pixels. To restate this method, the drive values of the two remaining non-defective sub-pixels may be changed so that the color point of the pixel as a unit remains as close to the correct value as possible. It will be obvious for those skilled in the art that this is easy to perform once the color co-ordinates of each sub pixel type (for example red, green and blue sub-pixels in case of a color display as in FIG. 2a) are available. The color coordinates (which may be expressed as (Y,x, y) co-ordinates, where Y is the intensity and x,y are the chromaticity co-ordinates) can be measured easily for each of the sub-pixel types and at one or more drive levels. The masking pixels may then be calculated with the normal minimization problem for each color independently such that the artificial defects are treated as real defects.

It is known that the human eye is more sensitive to intensity differences than to chromaticity differences. Therefore a third extension permits a color point error in order to keep the intensity error due to the defect as small as possible. Such an effect may be achieved by minimizing principally (or only) the intensity response of the eye. In one example, the drive signals for driving the remaining non-defective sub-pixels are changed in such a way that the luminance intensity error of the pixel as a unit is as small as possible, even though the color of the pixel as a unit may deviate from the color originally intended to be displayed. This change is again easy to perform once the color (e.g., (Y,x,y)) co-ordinates of each sub-pixel type (for example red, green and blue sub-pixels in case of a color display as in FIG. 2a) are available. Also in this case virtual defects may be introduced, possibly making the chromaticity error larger while minimizing the intensity error. It is for example known that red and blue sub-pixels have a smaller intensity value than a green sub-pixel at a same level of a drive signal. If a green sub-pixel is defective, therefore, such a method may be configured to drive the red and blue sub-pixels so as to have a higher intensity level.

Of course, it is also possible to mix the three extensions described above. This can be favorable for instance if the goal would be to limit at the same time both the intensity and color temperature errors, with minimization of one of these errors (e.g., the intensity errors) possibly being more important than minimization of the other.

Figure 7A:
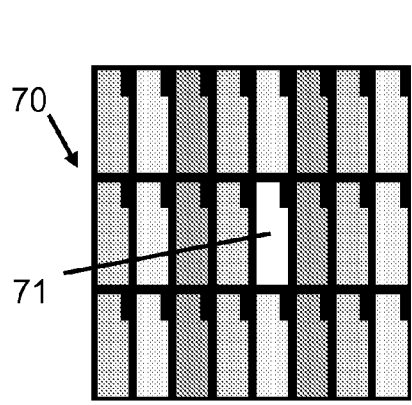
FIG. 7a shows the presence of a true defect of a green sub-pixel in a display.
Figure 7B:
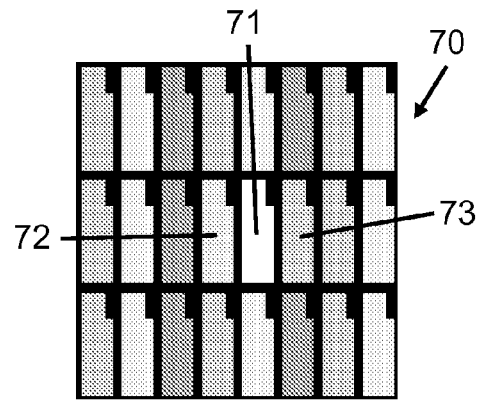
FIG. 7b shows the same green sub-pixel defect and artificial red and blue sub-pixel defects introduced to retain a color co-ordinate of the pixel which is as close to the correct color co-ordinate as possible.

It is to be noted that typically a model of the HVS response (such as the PSF) is (slightly) wavelength dependent. In such case, different models (e.g., PSFs) can be used for each sub-pixel color. FIG. 7a shows the presence of a true defect of a green sub-pixel 71 in the display 70. FIG. 7b shows the same green defective sub-pixel 70 and artificial red and blue defective sub-pixels 72, 73 introduced to retain or approximate the correct color co-ordinate of the pixel. The artificial defective pixels 72, 73 are not really present in the display but are introduced by altering the driving level of these pixels. For the situation in FIG. 7b, the minimization problem may be solved based on three defective sub-pixels: one true defective sub-pixel 71 and two artificially introduced defective sub-pixels 72, 73. For a case in which a pixel or subpixel has different PSFs for different color channels, expression (1) may be extended as follows:

$$[C_1, C_2, \ldots, C_n] = \operatorname*{argmin}_{C_1, C_2, \ldots, C_n} \int_{-\infty}^{+\infty}\int_{-\infty}^{+\infty} f(v_1, v_2, \ldots, v_m, x', y') dx' dy', \quad (8)$$

where $$v_j = E \times PSF_{je}(x', y') + \left[\sum_{i=1}^{n} C_i \times PSF_{ij}(x' - x_i', y' - y_i')\right]$$

for $1 \leq j \leq m$ (for a three-channel color scheme such as RGB or YUV, m=3), $PSF_{je}$ indicates the PSF of the defect that contributes to color channel j, and $PSF_{ij}$ indicates the PSF of the i-th masking pixel or subpixel that contributes to color channel j. Such an expression may also be applied to an RGBW display having white subpixels. In this case, the white sub-pixel would have a nonzero PSF for all three color channels, while subpixels of the individual colors may have nonzero contributions for only one color (if the subpixel is a pure color) or for more than one color (if the subpixel is not perfectly limited to only one color component). Examples of $f(v_1, v_2, \ldots, v_m, x', y')$ include $(\Sigma v_j)^2$, $\Sigma v_j^2$, $|\Sigma v_j|$, $\Sigma v_j^2 / \sqrt{(x')^2+(y')^2}$, and $(\Sigma v_j)^2/\sqrt{(x')^2+(y')^2}$ for $1 \leq j \leq m$, although the cost function $f$ is not limited to these examples. In further examples, cost function $f$ applies different weights to the contributions of the various color channels and/or weights luminance error more heavily than chrominance error. The cost function $f$ may also be configured according to more complex models of the HVS to account for a contrast sensitivity function, effects of masking and/or lateral inhibition, and/or similar artifacts of neuronal processing.

Figure 8:
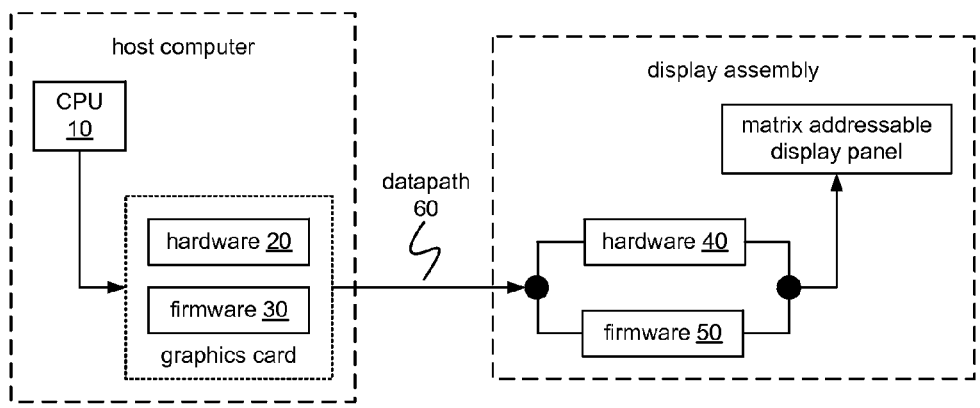
FIG. 8 illustrates possible locations for a real-time system for defect compensation according to an embodiment.

Visual compensation of a defect as described herein can be done in software and/or in hardware. Such an operation transforms the image into a pre-corrected image based on any of the schemes as described herein. FIG. 8 illustrates several possible locations at which a real-time defect processing system as described herein may be implemented. The system may be implemented such that the defect compensation is done by the CPU 10 of the host computer (for example, in the driver code of the graphics card, with a specific application, or embedded in a viewing application). Alternatively, the graphics card may be configured to perform the defect compensation in hardware 20 and/or in firmware 30. According to still another embodiment, the display assembly may be configured to perform the defect compensation in hardware 40 and/or in firmware 50. According to yet another embodiment, defect compensation may be done anywhere in the datapath 60 of the signal transmitted between the graphics card and the display assembly.

It is to be noted that defect compensation methods as described herein may be implemented for execution in real-time (at least at the frame rate of the display) and/or off-line (once, at specific times, or at a frame rate lower than the display frame rate).

Application of a defect compensation method as described herein may help to avoid the case in which a user of the display mistakes the defective pixel for an actual feature of the display image (i.e., the image delivered to the display assembly for viewing). In case of radiology, for example, it is possible that a radiologist would treat the defect as actually present in the display image, which could reduce the quality of a diagnosis. In another situation, application of such a method may help to avoid frustration of the user because the user's possibly new display shows one or more extremely visible pixel defects.

A general example of a device configured to characterize pixels of a display comprises a vision measurement system, i.e. a set-up for automated, electronic vision of the individual pixels of the matrix addressed display. Such a system may be used to measure the light output (e.g., luminance, which may be emitted or reflected depending on the type of display) by individual pixels 14. The vision measurement system comprises an image capturing device (for example, a flat bed scanner or a high resolution CCD camera) and possibly a movement device for moving at least one among the image capturing device and the display 12 with respect to each other. The image capturing device generates an output file, which is an electronic image file giving a detailed picture of the pixels 14 of the complete electronic display 12. Once an image of the pixels 14 of the display 12 has been obtained, a process is run to extract pixel characterization data from the electronic image obtained from the image capturing device.

Instead of or in addition to luminance, also color can be measured. The vision set-up is then slightly different and comprises a color measurement device (for example, a colorimetric camera or a scanning spectrograph). The underlying principle, however, is the same, in that a location of the pixel and its color are determined.

As described above, a defect in a display panel may be masked by applying a cost function, based on a model that represents a response of a human visual system, over a neighborhood of the defect. Such a method may include masking one or more defects by modulating other pixels in the neighborhood to minimize the cost function.

Such a method may include minimizing a cost function with respect to a projection of the defect on the retina. However, it is noted in this respect that a HVS includes more than the optical system of the eye. In addition to the response of the optical system of the eye, other effects such as retinal response to the projected image and/or post-receptor neuronal processing may affect what is perceived and may limit the visibility of certain features. When viewing a bright edge, for example, a HVS will be less sensitive to small changes in image content that are close to the edge. This effect is one manifestation of a mechanism called lateral inhibition. A HVS is also less sensitive to high frequencies at low amplitudes, an effect described by a measure of frequency response such as a contrast sensitivity function (CSF), which typically has a higher value for intensity than for color and may also differ between colors. As a consequence of retinal response and/or post-receptor processing, a defect may be rendered invisible even if the projection on the retina is not perfect. It may be desirable to take account of such effects such that compensation of defects that are beyond the limits of perception may be reduced or avoided. Alternatively or additionally, therefore, a method of defect compensation may include minimizing a cost function with respect to processing of the retinal image (e.g., by receptors within the eye and/or by neurons within the eye, along the optic nerve, and/or in the brain).

Figure 10:
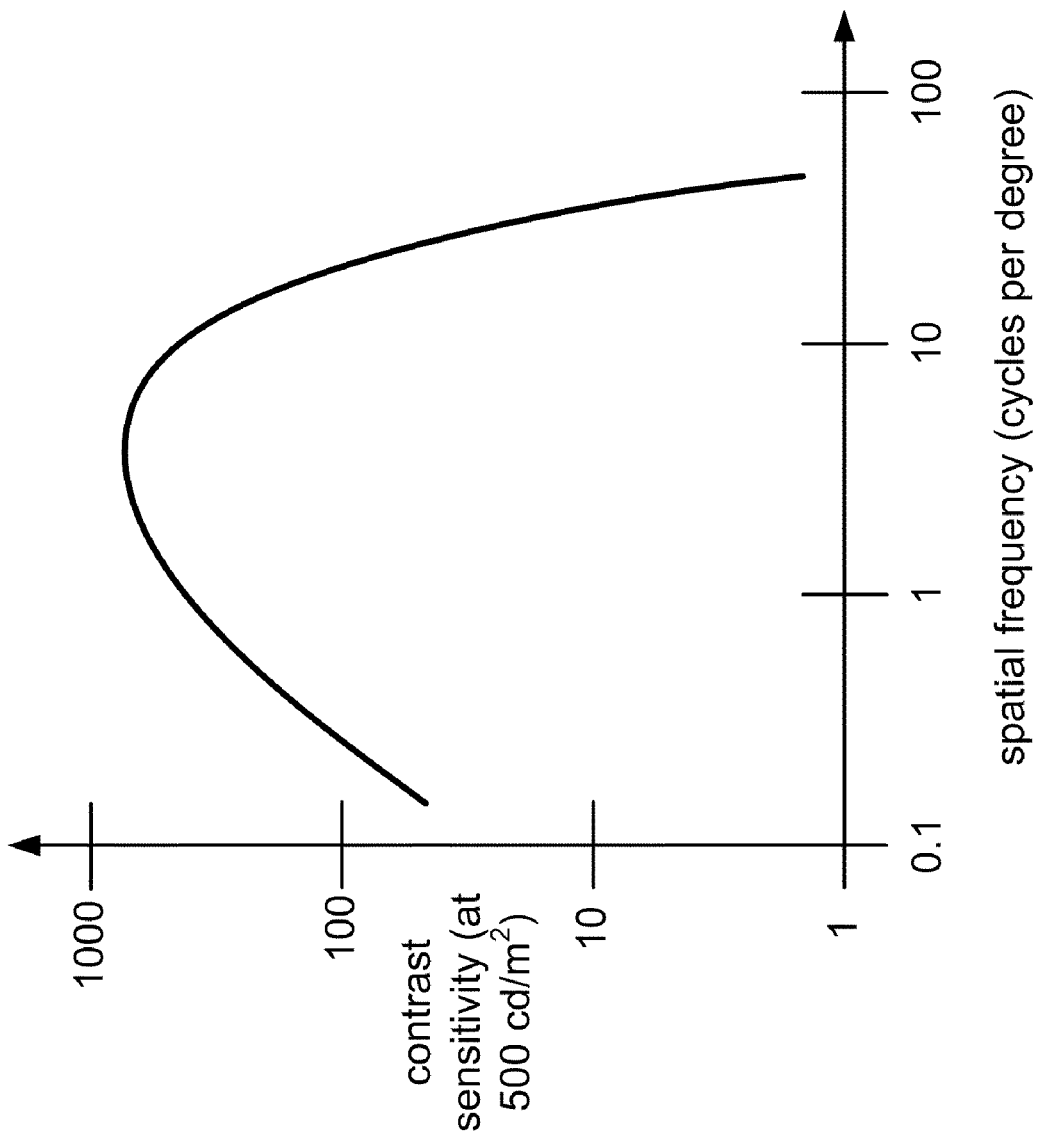
FIG. 10 shows one example of a plot of a contrast sensitivity function.

A contrast sensitivity function (CSF) describes, for each of a range of spatial frequencies measured in cycles per degree, the minimum amplitude needed for a sinusoid of that frequency to be perceptible. FIG. 10 shows one example of a plot of a CSF at a particular average illumination level. Typically the CSF will have a different shape for luminance than for chrominance, such that more detail is visible in the luminance channel than in the color channels. In characterizing such a function, it may be desirable to select a typical viewing distance in order to provide a correspondence between cycles per degree and distance along a plane of a display panel.

It may be desirable to modify a defect compensation operation (e.g., an operation according to the general model of expression (1) above) such that the acceptable level of uncompensated error is variable according to the visibility of such error as described by a model such as a CSF. For example, it may be desirable to vary the acceptable level of uncompensated error according to the spectral content of the display image in a neighborhood of the location of the defect. In such case, it may be desirable to allow a greater error in luminance and/or chrominance when the local spectral content of the display image is high.

A minimization algorithm according to the general model of expression (1) may also be modified according to other simple or complex models of the HVS, such as achromatic models proposed by Movshon ($CSF(f)=af^c e^{-bf}$, where $f$ denotes frequency in cycles per degree and values of 75, 0.2, and 0.8 may be used for a, b, and c in general use), P. G. J. Barten (e.g., in *Contrast Sensitivity of the Human Eye and its Effects on Image Quality*, SPIE, Bellingham, Wash., 1999), and S. Daly (e.g., in "Subroutine for the generation of a two dimensional human visual contrast sensitivity," *Technical Report* 233203Y, Eastman Kodak, 1987) and/or chromatic models proposed by K. T. Mullen (e.g., in "The contrast sensitivity of human colour vision to red-green and blue-yellow chromatic gratings," *Journal of Physiology*, 359: 381-400, 1985), S. Daly (e.g., in chap. 13 ("The Visible Differences Predictor: An algorithm for the assessment of image fidelity") of *Digital Images and Human Vision*, MIT Press, Cambridge, Mass., 1993), and S. N. Pattanaik et al. (e.g., in "Multiscale model of adaptation, spatial vision and colour appearance," *Proc. SIGGRAPH '98*, pp. 287-88, July 1998).

Another class of cost function minimization procedures that may be used for defect masking as disclosed herein is described in U.S. Publ. Pat. Appls. Nos. 2005/0169551 and 2007/0230818 (Messing et al.) and papers 15.2 ("Optimal Rendering for Colour Matrix Displays," L. J. Kerofsky and D. S. Messing) and 15.3 ("An Application of Optimal Rendering to Visually Mask Defective Subpixels," D. S. Messing and L. J. Kerofsky) of the Proceedings of ADEAC 2005 (Society for Information Display, Oct. 24-27, 2005). Such a procedure includes formulating a set of constraints (e.g., Lagrange constraints) to model a given subpixel geometry. The procedure also includes forming an error measure. A difference is calculated between the actual panel and an ideal display in a 1-D or 2-D spatial domain, and this difference is transformed into a frequency-domain array $E_f$. The array $E_f$ is perceptually weighted by applying a set of frequency-weighting filters that model the human visual system's sensitivity to luminance and chrominance detail. The error measure is calculated as a sum of the magnitudes (e.g., as a sum of the L2 norms) of the weighted components of $E_f$. An optimization problem based on the error measure and the set of constraints (e.g., a constrained Lagrange optimization problem) is solved to obtain an array of shift-variant filters, and these filters are applied to the respective color channels of the signal to be displayed.

An implementation of a defect compensation method as described herein may be adapted for use with a high dynamic range (HDR) display. One type of HDR display assembly is a multi-panel HDR display, which includes a stack of two or more display panels (also called "spatially modulated imaging layers," or simply "imaging layers," in the context of such a display). It is possible that some of the components that are customary in a single panel can be omitted or removed when two or more panels are stacked. In a two-panel stack, for example, the back polarizer of the front panel may be omitted or removed, since the front polarizer of the back panel can serve this purpose. Another example is that certain foils, such as brightness enhancement foils and polarization recycling foils, are typically only needed in the back panel. Of course, only one backlight is necessary. Such a display may achieve a contrast range that is theoretically the product of the contrast ranges of the individual panels. For example, two panels each having a contrast range of 100:1 may be stacked to achieve a theoretical contrast range of 10,000:1. Panels having contrast ranges of up to 1000:1 are presently available commercially, such that a multi-panel display having a contrast range of 1,000,000:1 may be currently possible. Because the maximum transmittance of each panel is less than 100%, possibly much less (typically 10% maximum), a multi-panel display may require a much stronger backlight than a single-panel display.

Note that a defective pixel is not limited to a completely black or completely white pixel. If a single pixel is defective in a multi-panel display, for example, then the defective pixel (which is viewed as the combination of the pixels of several panels that are on top of each other) could be perceived as a pixel having a limited or reduced dynamic range or luminance range as compared to non-defective pixels. Even for a case in which the defective pixel is stuck at completely black or white, the variable transmittance of other pixels in the optical path by which light passing through that pixel reaches the viewer's eye may result in an overall perception of a limited or reduced dynamic range or luminance range, rather than a perception of an entirely white or black pixel. It is also possible that only one domain of a pixel is defective. In some panels, a pixel is split into multiple spatial domains such that sub-pixels of one domain appear brighter when viewed from one off-axis direction (e.g., from the left) and sub-pixels of another domain appear brighter when viewed from another off-axis direction (e.g., from the right).

Masking values may be applied in a neighborhood that extends in three dimensions: the two dimensions of the plane of the panel having the defect, and another dimension to include at least one pixel of another panel in the stack. For example, such a masking may be applied over a neighborhood that is square in at least one panel (e.g., a 3×3 neighborhood in the plane of the panel, centered at the defect) and/or a neighborhood of some other shape (e.g., circular or diamond-shaped). A minimization algorithm according to the general model of expression (1) may be extended to apply to a neighborhood having three spatial dimensions. For example, such an algorithm may be modified to include a common luminance and/or color offset for two or more of the defective and/or masking pixels, where the common offset is due to a larger pixel in a corresponding area of another panel. It is also possible that a pixel of a panel can influence parts of one or more pixels of one or more panels in the other layers. If the backlight is not perfectly collimated, then one pixel may influence more than one pixel above it, even if the respective panels have the same resolution and are perfectly aligned. In such a case, the radiation pattern from the pixel may have a distribution that is somewhat Lambertian.

In some cases, it may be desirable to restrict the neighborhood in the plane of the pixel to one line (e.g., the line containing the defect). In other cases, it may be desirable to restrict the neighborhood to all pixels above or below the defect (e.g., pixels belonging to different panels), which is to say, a line containing the defect that is perpendicular to the display plane of the panel. In further cases, it may be desirable to restrict the neighborhood to the line containing the defect and all pixels above or below the defect. Such restrictions may require less hardware to implement. For example, additional storage (e.g., line buffers and/or delay elements) may be needed to implement correction over two dimensions in the display plane of the panel, and a restriction to one dimension in the display plane of the panel may allow a reduction in such hardware. It is also possible to apply such a restriction to a defect compensation method as applied to a single-panel display.

Application of defect compensation to a multi-panel display typically offers more degrees of freedom in compensating defects. For example, such a method may be configured to modulate a 3-D neighborhood of the defect. Such a masking method may be generally characterized as applying a filter to the masking pixels, where the filter also depends on characteristics of at least one other layer of the multi-panel display. Alternatively, such a method may be generally characterized as applying a filter that is dependent on an image contents of another panel of the stack (i.e., another imaging layer). Methods of defect compensation with or without masking are also described herein.

The panels of a multi-panel display may have the same resolution. However, an extreme contrast range is not typically needed over a small area (e.g., pixel by pixel), and high-contrast modulation is usually applied at lower frequencies. In some cases, it may be desirable to implement a multi-panel display using panels of different resolutions. For example, a back panel of lower resolution, which will typically be less expensive, may be used to display low-frequency information. Such a display assembly will typically include an image generator (which may be implemented in hardware, firmware, and/or software logic) that is configured to generate, for each display image, (A) a image containing more of the high-frequency content of the display image, for display on the front panel during a corresponding frame period, and (B) and a image containing more of the low-frequency content of the display image, for display on the back panel during the same frame period. Defect compensation as described herein may be performed on either or both of these images before display, according to a map of pixel defects of the corresponding imaging layer and/or according to a map of pixel defects of the other imaging layer. It is possible for the panels of a multi-layer display to have frame periods that are staggered with respect to each other and/or have different lengths, such that during the total time period that an image is displayed on one panel, two different images appear on another panel of the display.

Figure 11:
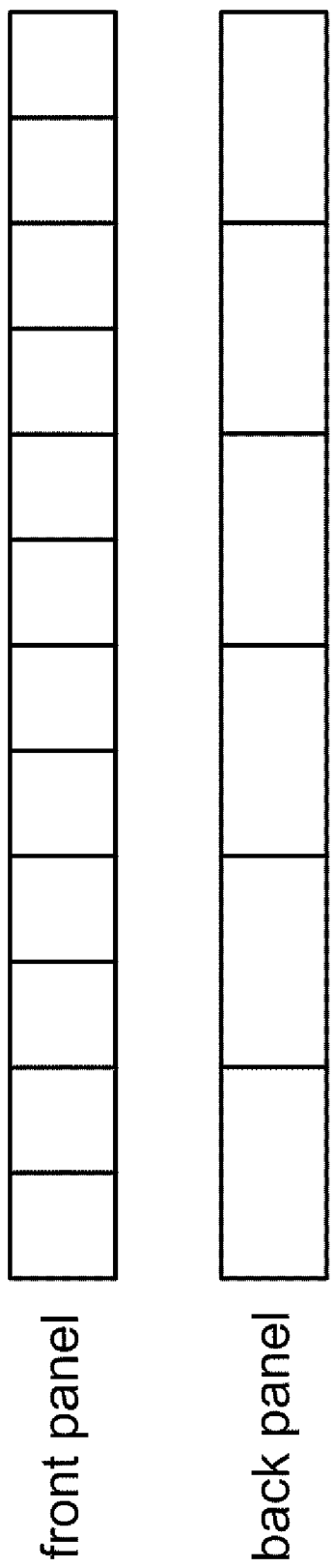
FIG. 11 shows a cross-section of a portion of a two-panel stack.

A two-panel stack may include a front panel having a standard resolution size of 1600×1200 pixels and a back panel having a standard resolution size of 1280×1024 or 1024×768 pixels, although any other standard or non-standard resolutions may also be used. In another example, the number of pixels in one or both directions of a high-resolution panel is an integer multiple of the number of pixels in the same direction of a low-resolution panel. For example, a front panel having a resolution of 1600×1200 may be paired with a back panel having a resolution of 800×600, so that each pixel of the back panel corresponds to a 2×2 neighborhood of the front panel. In the context of a multi-panel display, the term "front panel"

or "top panel" refers to a panel nearer to the viewer's eye, and the term "back panel" or "bottom panel" refers to a panel farther away from the viewer's eye (i.e., behind one or more other panels). FIG. 11 shows a cross-section of a portion of a two-panel stack in which each pixel of the back panel corresponds to two pixels of the front panel in the illustrated dimension.

The display stack may include more than two panels. Implementations of the correction method may be applied to any type of panel: in-plane switching (IPS), vertical alignment, etc. One panel may have a higher contrast ratio than another. For example, a back panel may have a higher contrast ratio than a front panel.

In a multi-panel display having panels of different resolutions, a defect may occur in a higher-resolution imaging layer and/or in a lower-resolution imaging layer. For a defect in a higher-resolution layer (e.g., a front layer), a corresponding compensation in a lower-resolution layer should account for its effect on other pixels in the higher-resolution layer. For a defect in a lower-resolution layer (e.g., a bottom layer), modification of a drive signal to a corresponding multi-pixel area in a higher-resolution layer may be performed. For a multi-panel display, the superposition function v may be expressed as the following sum of an error term and a masking summation:

$$v = E \times PSF(x', y') + \left[\sum_{i=1}^{n} L_i \times PSF(x' - x'_i, y' - y'_i)\right], \quad (9)$$

where $L_i$ denotes a masking luminance value superposed on the masking pixel $M_i$ with relative location $(x'_i, y'_i)$. Such a masking luminance value may be created by varying the transmittances of the component pixels that affect the display output at pixel $M_i$.

FIG. 13A illustrates a simplest case of a two-panel display in which each of the two aligned panels has the same resolution and each pixel is illuminated by a perfectly collimated backlight source. In this case, $L_i$ may be expressed as the product of three factors: the light intensity of the backlight source and the masking portions of the transmittances of the two component pixels, which depend on the respective driving levels. (The total transmittance of a component pixel may be expressed as a sum of an image portion, which corresponds to a value indicated by a display signal, and a masking portion, which may be calculated using expressions (1) and (9), for example.) Although the luminance factor $L_i$ may include contributions from multiple subfactors, only the PSF of the top panel is considered, as this panel is the one where the image to be viewed is formed.

As shown in FIG. 13B, in practice the backlight source is typically not perfectly collimated, such that the light transmitted by a pixel on a front panel depends on light from more than one pixel in a panel behind it. In this case, $L_i$ may be expressed as the product of (A) the masking portion of the transmittance of top pixel $M_i$ and (B) the sum, for each underlying panel, of the products of (B1) the masking portion of the transmittance for each pixel of that panel that affects pixel $M_i$ and (B2) the respective light intensity at pixel $M_i$ from that affecting pixel. For a case in which a defect in a lower layer causes multiple pixel errors at the top panel, superposition function v may be expressed as the following sum of masking terms and error terms:

$$v = \left[\sum_{i=1}^{n} L_i \times PSF(x' - x'_i, y' - y'_i)\right] + \quad (10)$$
$$E_1 \times PSF(x', y') + \left[\sum_{j=2}^{m} E_j \times PSF(x' - ex'_j, y' - ey'_j)\right],$$

which corresponds to a multiple-defect case as discussed above in relation to expression (3). Again, the PSFs in this expression correspond to PSFs of pixels of the top panel. As noted above, it may be desirable to restrict a compensation operation to operate over only one dimension of a display panel. For example, it may be desirable to limit expression (9) or (10) to operation, in one or more of the panels, over only one pixel or over only those pixels that are in a line (e.g., in one of the x' and y' directions) that includes the defect.

A multi-panel display may also be configured to have both color and monochrome panels. For example, such a display may be configured to have a color panel in front and a monochrome panel in back. Monochrome panels are typically less expensive (e.g., because no color filters are needed). The lack of color filters for at least one panel may also support a brighter display for the same backlight output. In such case, it may be desirable to modify the defect compensation method to account for the effect that a defect in, and/or modulation of, the monochrome layer may affect the perception of all colors of the corresponding area of a color layer.

A multi-panel display may also include one or more optical components between panels. Such an optical component may affect the impact of modulation of a pixel behind the component (e.g., by affecting the spatial area affected by the modulation). For example, a diffuser disposed between two panels may help to avoid moiré effects arising from interference between the pixel structures of the panels. Such a diffuser may also cause modulation of one or more pixels in a back panel to affect a larger corresponding area in a front panel. It may be desirable for the defect compensation operation to account for the effect of such optical components.

In a single-panel display, maskability of some defects may be limited by the driving levels of the masking pixels. For example, applying a calculated masking luminance value may in some cases require driving a pixel brighter than saturation or darker than an off state. The use of multiple panels reduces the probability of saturation of any of the panels, as it is unlikely that, for any one area of the screen display plane, corresponding areas of two or more panels will be driven close to saturation. For example, it is uncommon in image display that an entire area of the screen is extremely bright, as this condition could create an almost blinding effect. Therefore, a back panel carrying lower-frequency information is unlikely to be driven close to saturation, even if the higher-frequency portion of the image includes some extremely bright areas. Similarly, it is unlikely that, for any one area of the screen display plane, corresponding areas of two or more panels will be driven at a near-zero level. A multi-panel arrangement may thus allow opportunities for compensation of some defects that cannot be sufficiently compensated in a single-panel display assembly.

Another possibility is to reserve a margin on the drive level of one or more of the stacked panels so that the normal driving levels of the masking pixels do not impose as much of a limit on the possibilities of compensation anymore. For example, if during normal operation the back panel would only be driven up to maximum 90% drive level (that is to say, 100% drive level of the front panel and 90% drive level of the back panel corresponds to maximum white of the panel combination), then the remaining 10% can be used to drive the masking pixels as indicated by the compensation algorithm, which should be sufficient to be able to drive the masking pixels as needed by the compensation algorithm in nearly all cases. The same principle is valid for compensating white defects on almost black backgrounds: if one takes a margin at the lower video levels on one or more of the panels, then this margin can be used to make sure that masking pixels can always be driven sufficiently low even if the surrounding area is black. In a further example, margins are reserved at both the high and low ends of the driving level range (e.g., 5% at each end). When using stacked panels, one potential advantage is that while taking such a margin lowers the contrast, the remaining contrast still is sufficient and much higher as compared to a single-panel system. In single-panel systems, taking such a margin would typically result in panels having insufficient contrast and/or brightness.

Each panel of a multi-panel display has a characteristic curve that relates drive voltage to light output. The light output from the display stack at any particular time during operation may be expressed as the product of the light outputs (or transmittances) of the individual panels for the current driving voltages of the panels (with some allowance for other factors, such as loss due to intervening layers). A defect compensation method in a multi-panel display may be adapted to take advantage of the principle that a particular light output result may usually be obtained by any of several (typically many) different combinations of driving levels for the various panels. For example, it may be possible to compensate for (i.e., to mask, reduce, or even nullify) a defect in one panel by altering the drive of one or more corresponding pixels in another panel.

In one such example, a top pixel that is ten grey levels too dark is compensated by brightening an underlying back pixel. For a case in which the back pixel corresponds to more than one top pixel, the effect of such brightening on other top pixels may be compensated by darkening them appropriately. In such manner, a desired image result may be obtained without performing any masking. Any combination of such compensation with masking may also be used, as in some cases the defect may be too severe for the available level of compensation to adequately correct it.

The respective pixel drive levels used to obtain a particular display output level may also be adjusted to allow more latitude in defect compensation. If it is desired to modulate pixels in an area of a panel that is close to saturation, for example, then another panel may be driven brighter in that area to allow the drive signal for the first panel to be reduced. The resulting increase in latitude may be sufficient to allow a set of masking values capable of masking the defect to be applied to masking pixels in the first panel.

It is noted that the imaging layers of a multi-panel display need not be attached to or parallel to one another or even have the same size as one another. In one such example, the backmost layer is a matrix-addressable digital mirror device (DMD) or LCOS (liquid crystal on silicon) device that is arranged to direct light to one or more other imaging layers, possibly via an optical system including one or more lenses and/or mirrors.

Figure 12B:
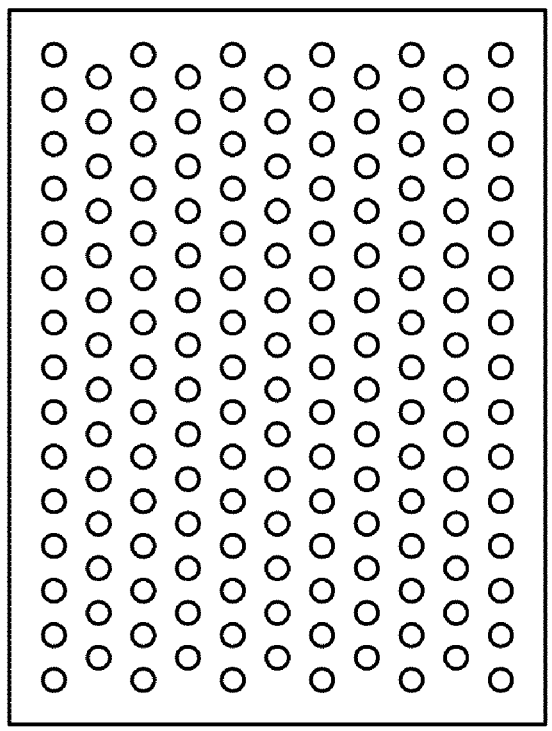
FIGS. 12A and 12B show two different configurations of LED backlight sources.
Figure 12A:
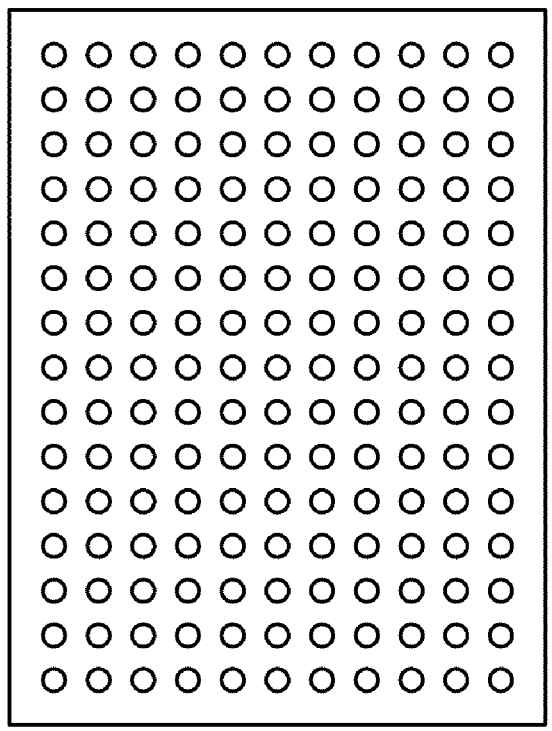

Another type of HDR display uses a spatially modulated backlight. It is noted that a display of this type is also a multi-layer display assembly, in which the backmost of the two or more imaging layers is a spatially modulated backlight. Such a backlight may be implemented as an array of spatially distributed and separately controllable point sources, such as an array of LEDs and/or an active-matrix organic LED (OLED) or polymeric LED (PLED) panel. The array is typically at least substantially coplanar and may have a curve whose radius is large compared to the planar dimensions of the array. One example of such a backlight includes several hundred small LEDs that are arranged in a plane parallel to and behind an LCD panel and are modulated individually and/or in groups according to the local (e.g., low-frequency) content of the display image. Some particular examples include LEDs that have a diameter of 5 millimeters, LEDs that have a diameter of 12 millimeters, LEDs that are packed in square or other quadrilateral (e.g., diamond) configuration as shown in FIG. 12A, and LEDs that are packed in a hexagonal configuration as shown in FIG. 12B. Each point source of the backlight and each pixel or subpixel of the panel may be configured to operate at any of a discrete number of luminance levels (e.g., 256 or 1024), which may be linear or nonlinear (e.g., with increasing step size as luminance increases). The backlight and panel may differ in the number and/or linearity of the operating luminance levels. In some cases, the backlight may be configured to flicker in synchronism with the panel (e.g., to reduce motion blur), which flickering may occur across the entire display or within only a currently selected portion of the display.

Figure 14A:
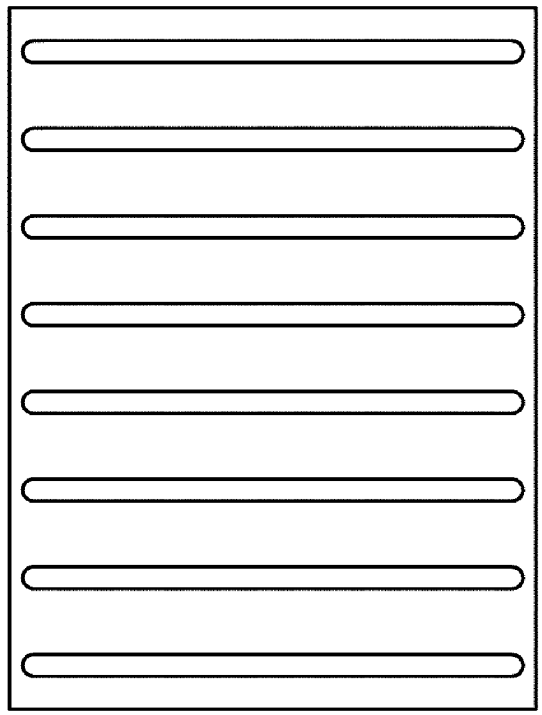
FIGS. 14A and 14B show two example configurations of fluorescent backlight sources.
Figure 14B:
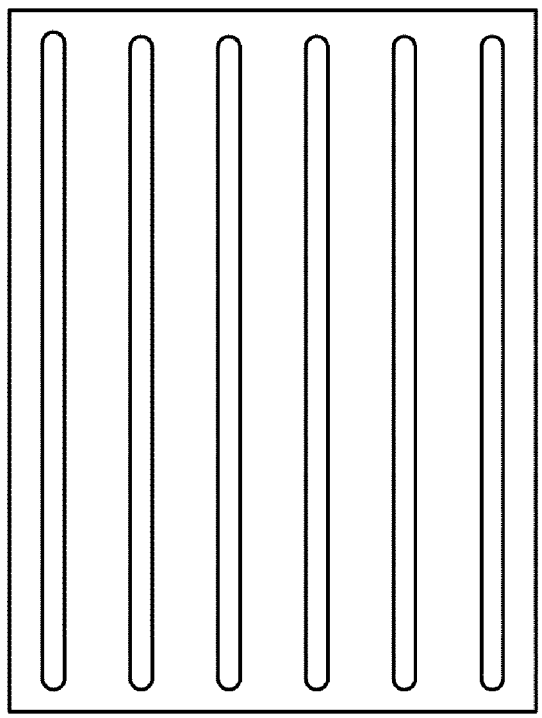

Another possible implementation of a spatially modulated backlight includes a plurality of (e.g., eight or twelve) fluorescent lamps and/or tubes (such as cold-cathode or hot-cathode fluorescent lamps (CCFLs, HCFLs)) that can be individually modulated. Such a fluorescent backlight allows spatial modulation of the luminance and/or color in one direction (e.g., one dimension of the display plane). It may be desirable to use lamps whose light outputs may be modulated rapidly enough to avoid visible flicker (e.g., at a modulation rate at least equal to a frame rate of the panel). FIGS. 14A and 14B show examples of such a backlight. Other configurations of a fluorescent backlight may use U-shaped tubes instead.

The spatially modulated backlight may be monochrome. For example, such a backlight may be made of white LEDs or fluorescent lamps. Alternatively, the spatially modulated backlight may include point sources of different colors. It is also possible for such a backlight to include one or more point sources (e.g., an array of point sources) each having two or more different colors. A source having different colors may be implemented as a die having multiple color emitters. In some cases, it may be possible to approximate such a source as a point source. For example, the source may include an optical system such as a microlens. Alternatively, such a source may include a group of two of more packages such that it may be desirable for a defect compensation method to account for the different spatial locations of the various colors. Some typical examples of the different colors within a multicolor source include red, green, and blue (RGB); red, green, blue, and green (RGBG); red, green, blue, and white (RGBW); and red, blue, blue-green, and yellow-green.

One or more of the point sources of a spatially modulated backlight may be defective (e.g., may be always on or always off, or may otherwise have a response to its driving signal that is visibly different than that of other point sources in the backlight of the same color or type). In a backlight having several hundred LEDs, for example, it is not uncommon for at least one of the LEDs to be defective. A defect compensation method (e.g., according to expression (1) with expression (9) or (10)) may be applied to an HDR display having a spatially modulated backlight in a comparable manner to that of a multi-panel display having a low-resolution back panel as described above. A defect compensation method as described herein may also be applied to mask failure of a light source within a spatially modulated backlight. Such a failure may be modeled as a defective pixel, such that panel pixels are modulated to mask the defective light source.

Typically a failure of an individual LED in a spatially modulated backlight will affect the luminances of many pixels of the panel or panels above that defect. In other words, the light of a single LED will typically serve as backlight for multiple pixels of the panel or panels. More generally, the radiation pattern of a single LED of the backlight is typically such that the LED will influence the luminance and/or color point of more than one pixel of the panel or panels that are combined with the backlight. FIG. 13C shows an example of backlight sources having overlapping radiation patterns and pixels that transmit light from multiple backlight sources. In such case, a masking luminance value $L_i$ may depend on several or many underlying backlight source drive levels. In the limit, the light intensity for a pixel may be a sum of contributions of all of the individual sources in the backlight. Practically, the light intensity for a pixel may be limited to a sum of contributions of the two, three, or four closest backlight sources, such as an average of these sources.

Figure 15:
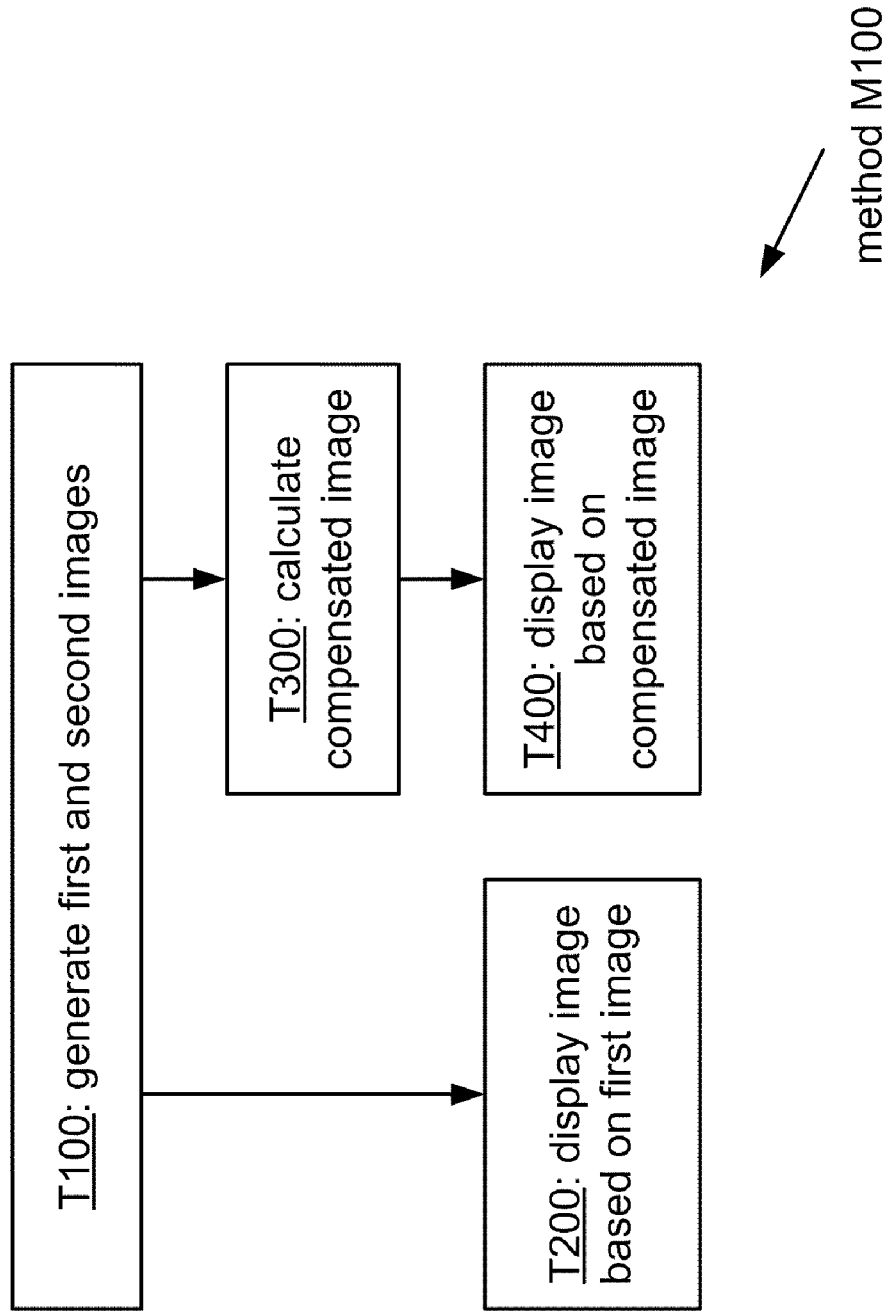
FIG. 15 shows a flowchart of a method for processing a display image M100 according to an embodiment.

FIG. 15 shows a flowchart of a method for processing a display image M100 according to an embodiment. Based on the display image, task T100 generates first and second images. For example, task T100 may be configured (A) to generate the first image to include more high-frequency content of the display image than the second image and (B) to generate the second image to include more low-frequency content of the display image than the first image. During a first time period (e.g., a first frame period or portion thereof), task T200 displays an image based on the first image on a first imaging layer of a display assembly. For example, task T200 may be configured to display the first image after conversion using one or more LUTs as shown in FIG. 6.

Based on the second image and a map of pixel defects of the first imaging layer, task T300 calculates a compensated image according to a defect compensation method as described herein. For example, task T300 may be configured to calculate the compensated image according to a variation of expression (1) (e.g., using expression (9) or (10)). The map of pixel defects typically indicates locations and responses of defective pixels of the first imaging layer. The defective pixel responses may be expressed, for example, in terms of additive errors, multiplicative errors, nonlinear errors, and/or limit errors. Task T300 may also be configured to calculate the compensated image based on a map of pixel defects of the second imaging layer. During the first time period, task T400 displays an image based on the compensated image on a second imaging layer of the display assembly. For example, task T400 may be configured to display the compensated image after conversion using one or more LUTs as shown in FIG. 6.

Figure 16:
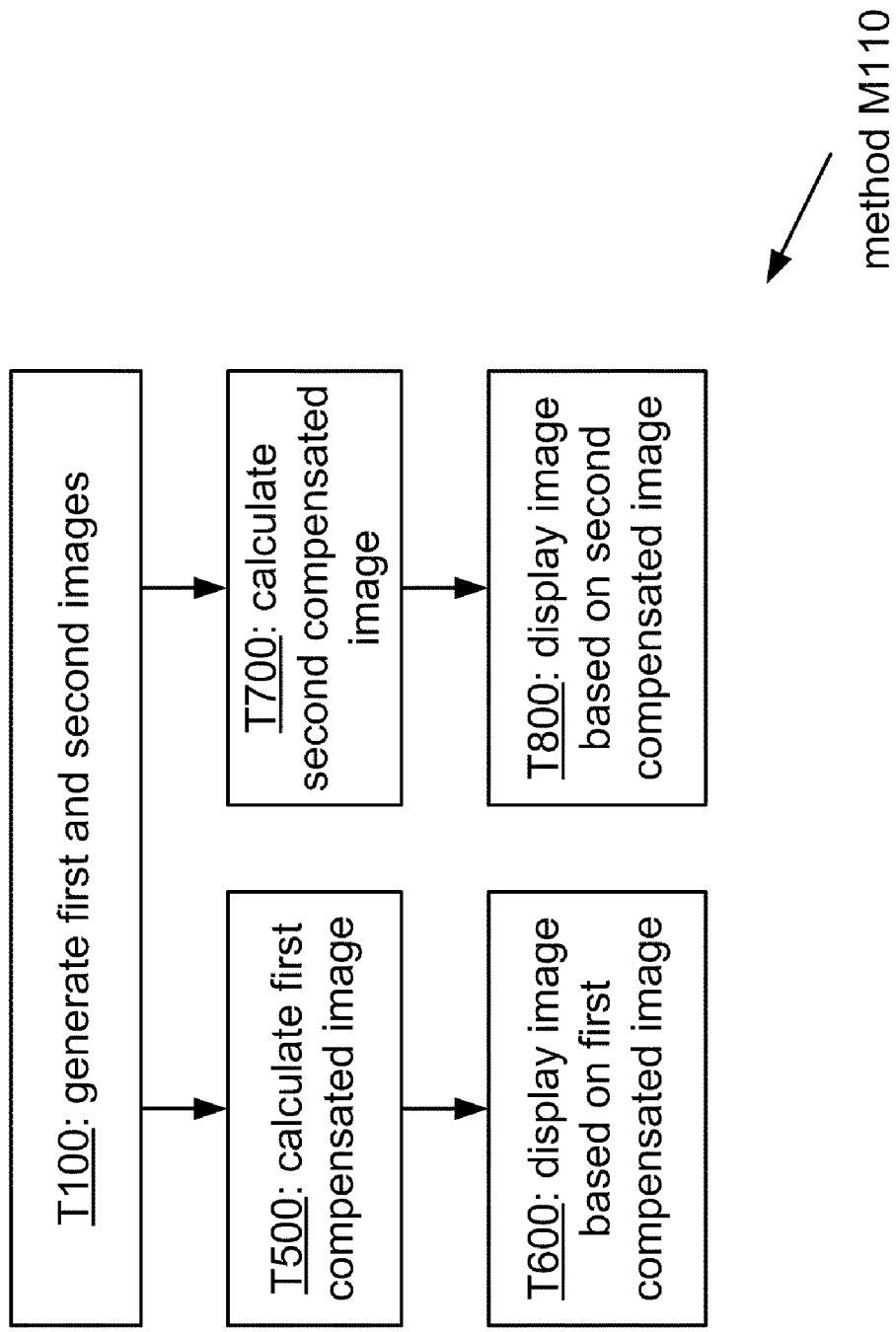
FIG. 16 shows a flowchart of an implementation M110 of method M100.

FIG. 16 shows a flowchart of an implementation M110 of method M100. Based on the first image and a map of pixel defects of the first imaging layer of a display assembly, task T500 calculates a first compensated image according to a defect compensation method as described herein. For example, task T500 may be configured to calculate the first compensated image according to a single-panel or multipanel variation of expression (1) as described herein. Task T500 may also be configured to calculate the first compensated image based on a map of pixel defects of the second imaging layer. During a first time period, task T600 displays an image based on the first compensated image on the first imaging layer. For example, task T600 may be configured to display the first compensated image after conversion using one or more LUTs as shown in FIG. 6.

Based on the second image and the map of pixel defects of the first imaging layer, task T700 calculates a second compensated image according to a defect compensation method as described herein. For example, task T700 may be configured to calculate the second compensated image according to a variation of expression (1) (e.g., using expression (9) or (10)). Task T700 may also be configured to calculate the second compensated image based on a map of pixel defects of the second imaging layer. During the first time period, task T800 displays an image based on the second compensated image on a second imaging layer of the display assembly. For example, task T800 may be configured to display the second compensated image after conversion using one or more LUTs as shown in FIG. 6.

Figure 17:
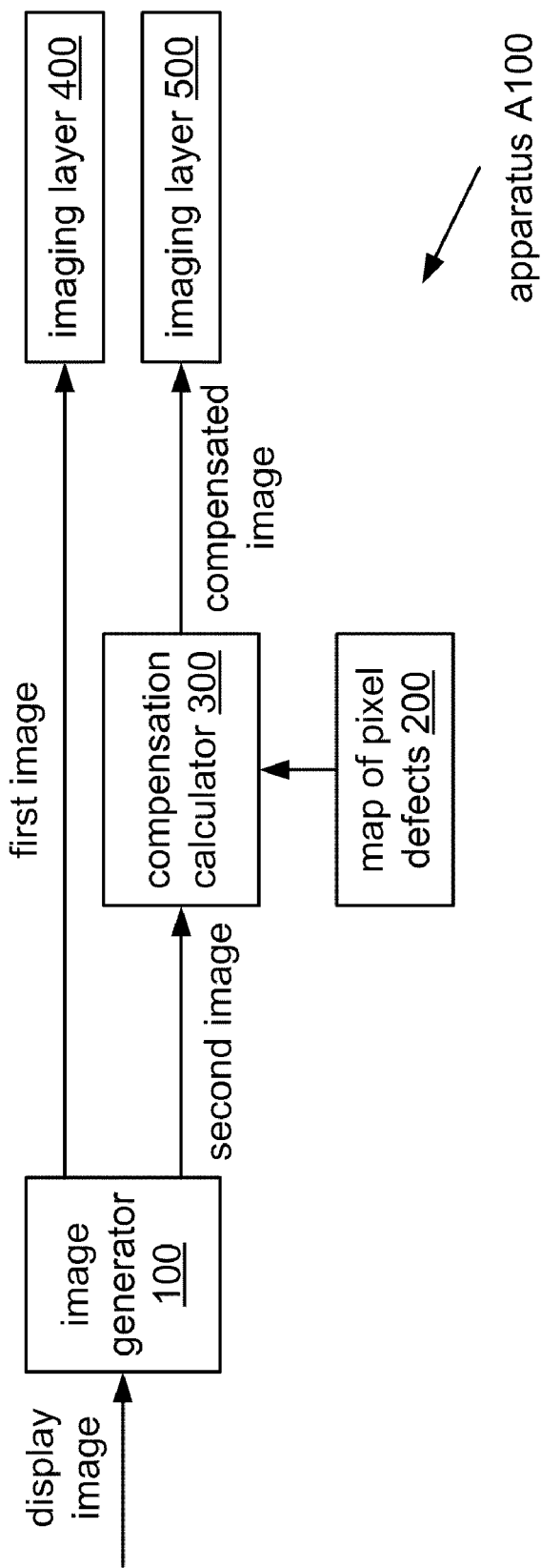
FIG. 17 shows a block diagram of an apparatus A100 according to an embodiment.

FIG. 17 shows a block diagram of an apparatus A100 according to an embodiment, which may be included in a display assembly and may be configured to perform an implementation of method M100. Image generator 100 is configured to generate first and second images based on a display image. For example, image generator 100 may be configured (A) to generate the first image to include more high-frequency content of the display image than the second image and (B) to generate the second image to include more low-frequency content of the display image than the first image. A first imaging layer 400 of a display assembly is configured to display an image based on the first image during a first time period (e.g., a first frame period or portion thereof). For example, first imaging layer 400 may be configured to display the first image after conversion using one or more LUTs as shown in FIG. 6. Apparatus A100 may include a display signal generator (not shown) that is configured to perform such conversion and may include one or more such LUTs.

Compensation calculator 300 is configured to calculate a compensated image, based on the second image and a map of pixel defects 200 of the first imaging layer, according to a defect compensation method as described herein. For example, compensation calculator 300 may be configured to calculate the compensated image according to a variation of expression (1) (e.g., using expression (9) or (10)). The map of pixel defects 200 typically indicates locations and responses of defective pixels of the first imaging layer. The defective pixel responses may be expressed, for example, in terms of additive errors, multiplicative errors, nonlinear errors, and/or limit errors. Compensation calculator 300 may also be configured to calculate the compensated image based on a map of pixel defects of the second imaging layer.

A second imaging layer 500 of the display assembly is configured to display an image based on the compensated image during the first time period. For example, second imaging layer 500 may be configured to display the compensated image after conversion using one or more LUTs as shown in FIG. 6. As noted above, apparatus A100 may include a display signal generator that is configured to perform such conversion.

Figure 18:
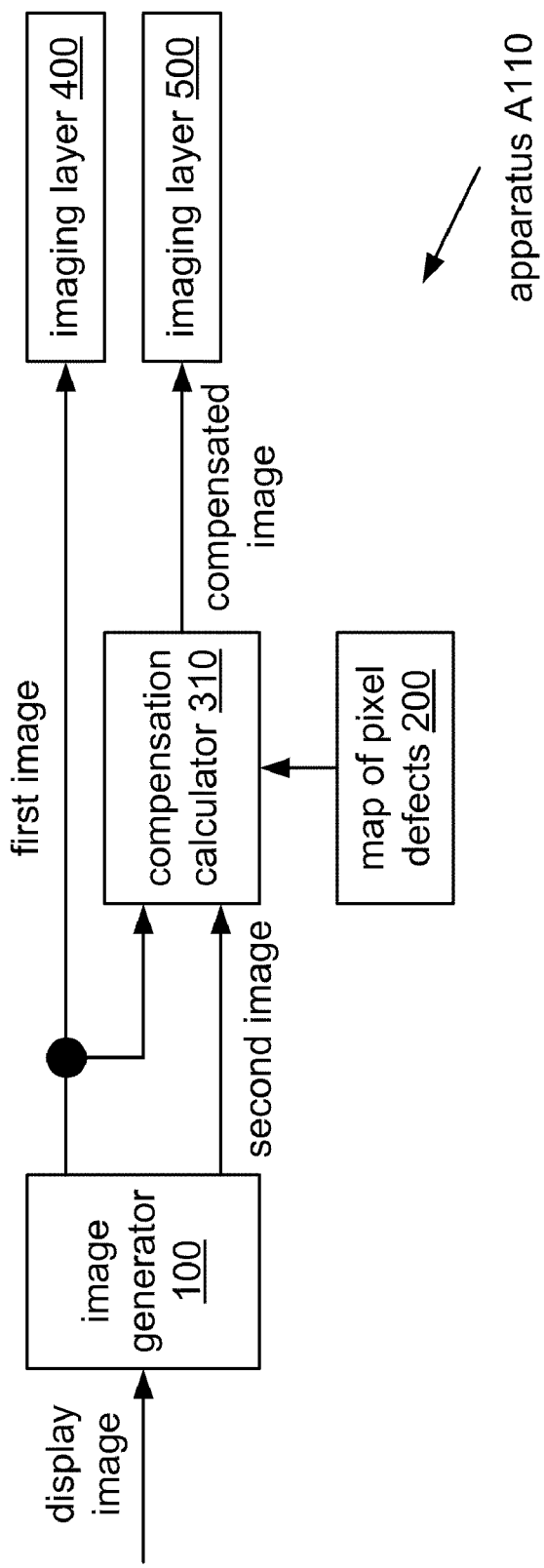
FIG. 18 shows a block diagram of an implementation A110 of apparatus A100.

FIG. 18 shows a block diagram of an implementation A110 of apparatus A100, which may be configured to perform an implementation of method M110. Apparatus A110 includes an implementation 310 of compensation calculator 300 that is configured to calculate the compensated image based on information from the first image. For example, compensation calculator 310 may be configured to calculate a pixel value for a location of the compensated image, based on one or more pixel values from a corresponding location or neighborhood of the first image, according to a variation of expression (1) (e.g., using expression (9) or (10)).

Figure 19:
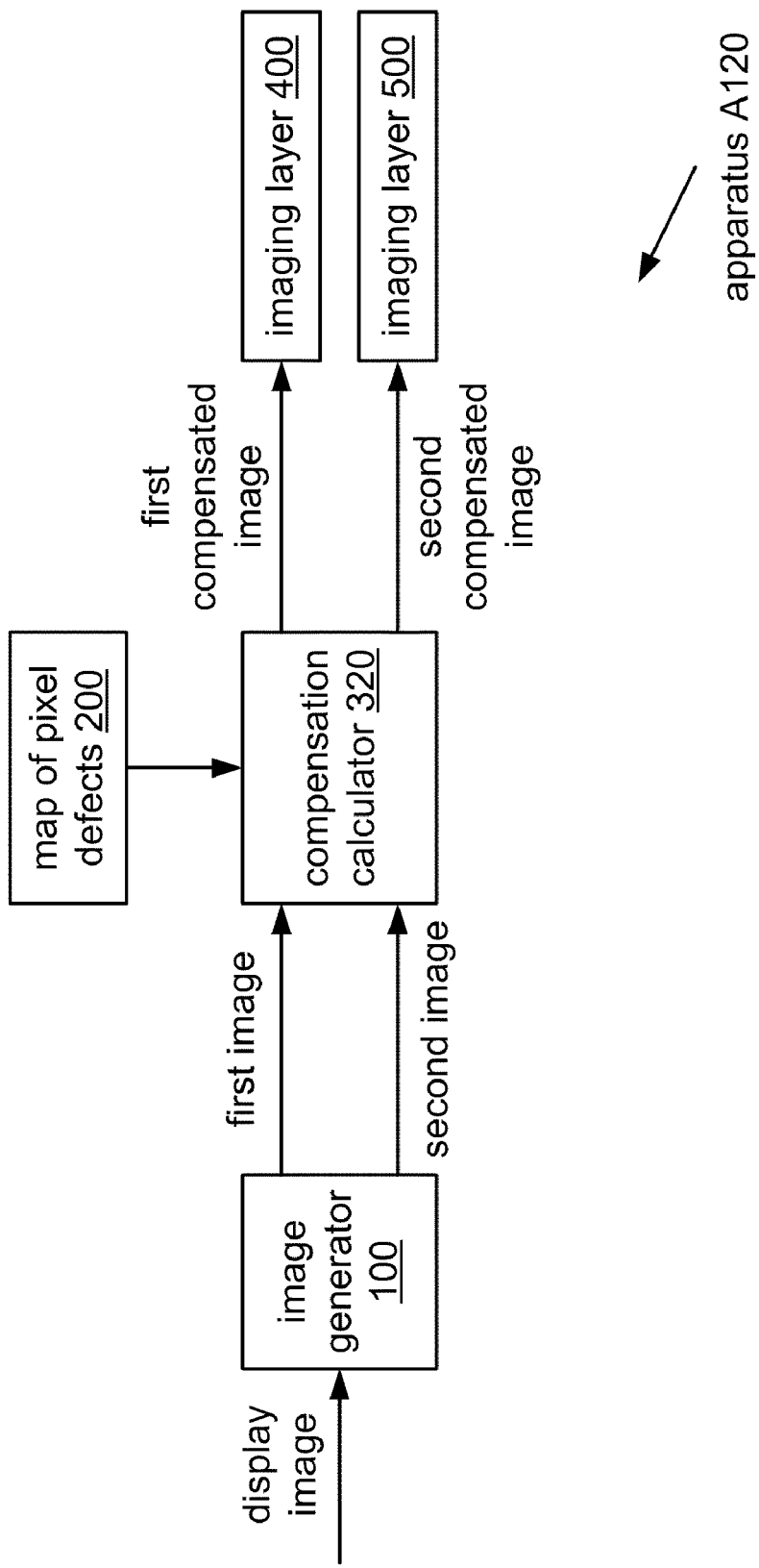
FIG. 19 shows a block diagram of an implementation A120 of apparatus A100.

FIG. 19 shows a block diagram of an implementation A120 of apparatus A100. Apparatus A120 includes an implementation 320 of compensation calculator 300 that is configured to calculate a first compensated image, based on the first image and the map of pixel defects 200 of the first imaging layer, according to a defect compensation method as described herein. For example, compensation calculator 320 may be configured to calculate the first compensated image according to a single-panel or multi-panel variation of expression (1) as described herein. Compensation calculator 320 may also be configured to calculate the first compensated image based on a map of pixel defects of the second imaging layer and/or on information from the second image. For example, compensation calculator 320 may be configured to calculate a pixel value for a location of the first compensated image, based on one or more pixel values from a corresponding location or neighborhood of the second image, according to a variation of expression (1) (e.g., using expression (9) or (10)).

Compensation calculator 320 is also configured to calculate a second compensated image, based on the second image and a map of pixel defects 200 of the first imaging layer, according to a defect compensation method as described herein. For example, compensation calculator 320 may be configured to calculate the compensated image according to a variation of expression (1) (e.g., using expression (9) or (10)). Compensation calculator 320 may also be configured to calculate the second compensated image based on a map of pixel defects of the second imaging layer and/or on information from the first image. For example, compensation calculator 320 may be configured to calculate a pixel value for a location of the second compensated image, based on one or more pixel values from a corresponding location or neighborhood of the first image, according to a variation of expression (1) (e.g., using expression (9) or (10)).

Figure 20:
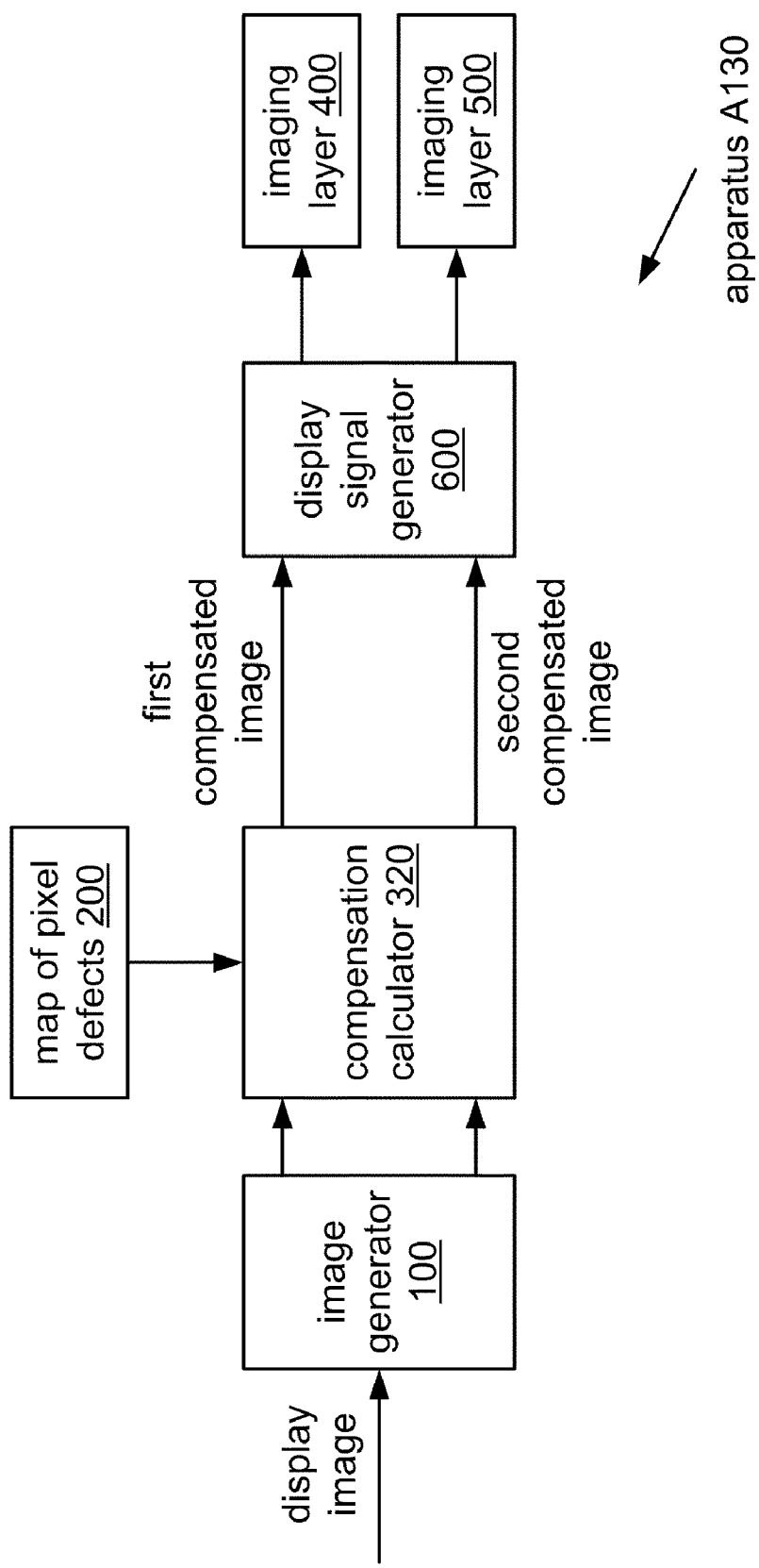
FIG. 20 shows a block diagram of an implementation A130 of apparatus A120.

First imaging layer 400 is configured to display an image based on the first compensated image during a first time period (e.g., a first frame period or portion thereof), and second imaging layer 500 is configured to display an image based on the second compensated image during the first time period. For example, the first and second imaging layers may be configured to display the respective compensated images after conversion using one or more LUTs as shown in FIG. 6. FIG. 20 shows an implementation A130 of apparatus A120 that includes a display signal generator 600 which is configured to perform such conversion and may include one or more such LUTs.

In method M100, the compensated image will typically be equal to the second image except at, or in the neighborhood of, the location of at least one of defective pixels indicated in the map of pixel defects of the first imaging layer (although other processing of the compensated image, such as filtering, is also possible). In method M110, each of the first and second compensated images will typically be equal to the corresponding one of the first and second images, except at or in the neighborhood of the location of at least one of defective pixels indicated in the map of pixel defects of the first imaging layer (although other processing of one or both of the compensated images, such as filtering, is also possible). As described herein, defect compensation may also be implemented such that the first image and the first compensated image, and/or the second image and the (second) compensated image, also differ at or in the neighborhood of the location of at least one defective pixel as indicated in a map of pixel defects of the second imaging layer.

At or near the location of a pixel defect, a pixel value of a compensated image may be based on one or more corresponding pixel values of the first and/or second image, depending on the particular defect compensation method (e.g., depending on the particular implementation of expression (1) that is used). FIGS. 21A-D show several examples of such relations at pixel locations that correspond visually to a hypothetical location of a defective pixel of the first imaging layer. FIG. 21A shows one example of a dependency between a pixel value of a second image, as produced by an implementation of task T100 or image generator 100, and a pixel value at a corresponding location of a compensated image (as produced by an implementation of task T300 or compensation calculator 300) or a second compensated image (as produced by an implementation of task T700 or compensation calculator 320). FIG. 21B shows one example of a dependency between a pixel value of a first image, as produced by an implementation of task T100 or image generator 100, and a pixel value at a corresponding location of a compensated image (as produced by an implementation of task T300 or compensation calculator 300) or second compensated image (as produced by an implementation of task T700 or compensation calculator 320).

It may be desirable to implement the defect compensation such that a pixel value in the (second) compensated image is based on more than one pixel value in a corresponding area of the first image. For example, the pixels of the second imaging layer may be larger than those of the first imaging layer, such that a pixel value of the (second) compensated image corresponds visually to more than one pixel value of the first image. FIG. 21C shows one example of such a dependency between a plurality of pixel values in a neighborhood of a first image, as produced by an implementation of task T100 or image generator 100, and a pixel value at a corresponding location of a compensated image (as produced by an implementation of task T300 or compensation calculator 300) or second compensated image (as produced by an implementation of task T700 or compensation calculator 320).

Likewise, it may be desirable to implement the defect compensation such that more than one pixel value in an area of a first compensated image is based on a corresponding pixel value in the second image. FIG. 21D shows one example of such a dependency between a pixel value of a second image, as produced by an implementation of task T100 or image generator 100, and a plurality of pixel values within a neighborhood of a corresponding location of a first compensated image, as produced by an implementation of task T500 or compensation calculator 320.

A defect compensation method as described herein may also be adapted for use with various types of three-dimensional (3-D) displays. Potential applications for 3-D displays include viewing synthetic and/or reconstructed volumes in three dimensions, which may be useful in such diverse fields as medical imaging (e.g., mammography, tomosynthesis, surgery visualization, etc.), aircraft collision avoidance, and engineering design.

Some types of stereoscopic displays require the viewer to wear some sort of apparatus to perceive the 3-D image. One example of a stereoscopic display is a head-mounted display that includes a different display panel (e.g., a small LCD panel) for each eye. In this case, a defect compensation algorithm as described herein may be applied to a defect in a panel.

Another example of a stereoscopic display includes a multiplexed two-dimensional display and a view splitter that is worn by the viewer (e.g., like a pair of glasses). The view splitter is configured to pass light from some pixels more to the left eye than to the right eye, and to pass light from other pixels more to the right eye than to the In one such example, the two-dimensional display is time-multiplexed, and the view splitter is a pair of special glasses having shutters synchronized to the display (e.g., the shutter in front of each eye is synchronized to a different time domain of the display). In this case, a defect compensation algorithm as described herein may be applied to a defect in one of the shutters.

In another such example, the two-dimensional display is time-multiplexed; the panel illumination that is modulated by the display panel is also time-multiplexed, in synchronism with the display panel, between two orthogonal polarizations; and the view splitter is a pair of glasses having a polarizer over each eye that passes a different one of the two polarizations. In this case, a defect compensation algorithm as described herein may be applied to a polarization-dependent defect in the panel.

In a further example, the two-dimensional display is wavelength-multiplexed between two different colors (e.g., red and blue), and the view splitter is a pair of glasses having a filter over each eye that passes a different one of the two colors. In this case, a defect compensation algorithm as described herein may be applied to a color-dependent defect in the panel (e.g., to a defect in a color sub-pixel). Such an example may also be implemented as a time-multiplexed monochrome display panel illuminated by a backlight that is configured to switch between the two colors in synchronism with the display. In this case, a defect compensation algorithm as described herein may be applied to a defect in the panel and/or to a color-dependent defect in the backlight (e.g., to a defect in a colored LED).

Other types of stereoscopic display (also called "autostereoscopic displays") provide an image having a three-dimensional appearance without the need for special glasses or other headgear. Such a display includes a display panel or other spatial light modulator (e.g., an LCD panel) and a view splitter disposed between the panel or modulator and the viewer. For example, the view splitter may be implemented as a splitting screen that has at least substantially the same height and width as the viewing portion of the display panel and is disposed parallel to and at some distance (typically a few millimeters) in front of the display plane of the panel. The splitting screen is configured such that some pixels of the panel can only be viewed by one eye, and other pixels of the panel can only be viewed by the other eye, although some crosstalk between the views may be expected.

It may be desirable for light entering the view splitter to be collimated. In one example, the panel is illuminated using laser light. In a more common example, an autostereoscopic display includes a collimator disposed between the panel and view splitter, or between the panel and the backlight. Such a collimator may be implemented as a Fresnel lens or a filter configured to transmit light only with a certain narrow range of angles in at least one dimension, such as a plate with holes or slits or a multilayer interference filter.

One type of splitting screen (a blocking screen) may be implemented to include a parallax barrier. For each eye, the barrier blocks light from certain pixels from reaching that eye. A parallax barrier is implemented to have a pattern of parts that pass light (i.e., reflective or transmissive regions) alternating with parts that block light (i.e., absorptive or opaque regions). Typically the widths of the blocking and passing parts are on the order of the width of a pixel of the LCD panel.

Figure 22A:
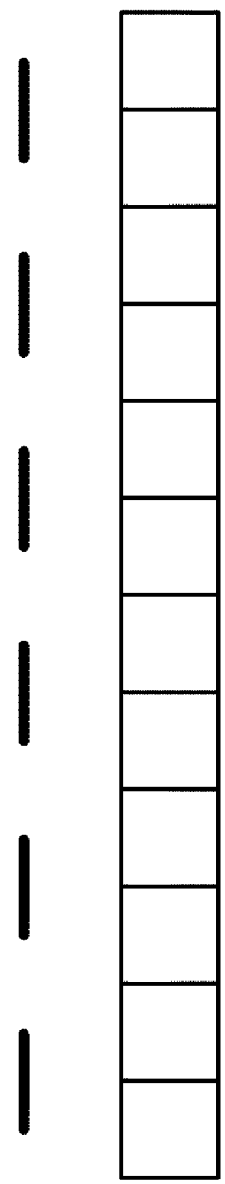
FIG. 22A shows an example of a fixed parallax barrier disposed in front of a display panel.
Figure 22B:
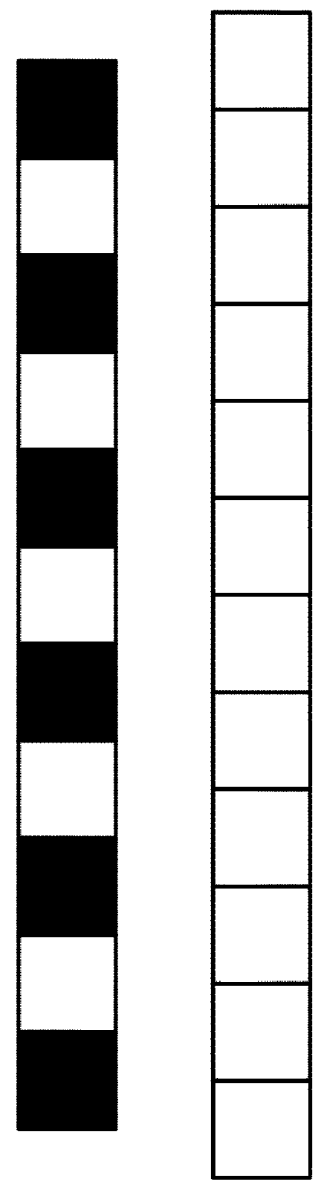
FIG. 22B shows an example of a dynamic parallax barrier disposed in front of a display panel.

A fixed parallax barrier may be implemented as an optical sheet with a grating, or as a patterned mask having an alternating series of black vertical lines and clear slits or having some other pattern. FIG. 22A shows one example of such a fixed parallax barrier. Alternatively, a dynamic parallax barrier may be implemented as a spatial light modulator (such as another LCD panel) in which a blocking pattern is formed by brightening and darkening pixels to form the passing and blocking parts and in which the blocking pattern may be changed. FIG. 22B shows one example of such a dynamic parallax barrier.

Figure 23:
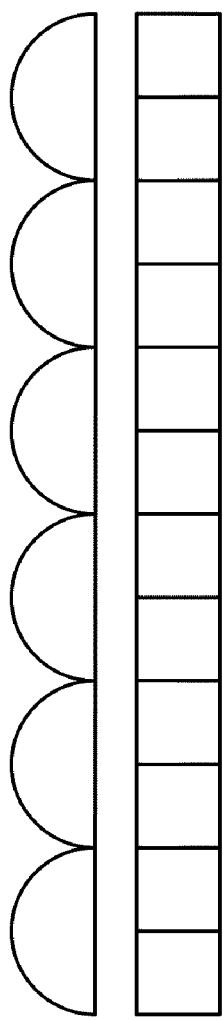
FIG. 23 shows an example of a fixed lens structure disposed in front of a display panel.
Figure 24B:
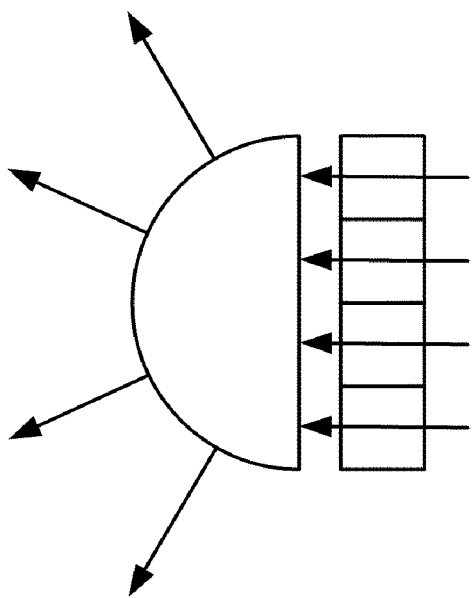
FIG. 24B shows one example of a generation, by a lens or other optical structure, of four different views from adjacent pixels of a display panel.
Figure 24A:
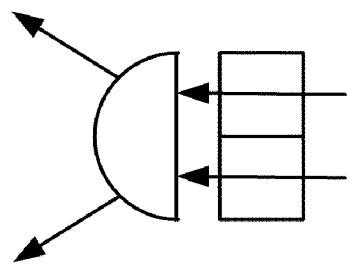
FIG. 24A shows an example of diversion, by a lens or other optical structure, of light emanating from adjacent pixels of a display panel to form two separate views.

Another type of view splitter is configured to divert light from portions of the display to one or the other of the viewer's eyes. One type of a diverting splitting screen is a lenticular screen. Such a screen includes an array of microlenses that directs the light from each pixel to one eye or the other. The lens structure may be fixed, such as an array of cylindrical lenses (e.g., a one-dimensional array of lenses that extend vertically from top to bottom of the display and have semi-cylindrical cross-sections). FIG. 23 shows one example of a panel having such a fixed lens structure, and FIG. 24A shows an example of diversion of light emanating from adjacent pixels to form two separate views. Another type of fixed lens structure is an array of round or integral lenses (e.g., a two-dimensional array of lenses having round cross-sections in a plane parallel to the display plane).

Alternatively, the lens structure may be dynamic, such as an array of controllable lenses. The array of controllable lenses may be implemented to include liquid lenses. Such a lens may be configured to operate according to electrowetting (i.e., in a lens cell, varying the contact angle of an interface between two substances to the boundary of the cell according to an electrostatic potential). In one type of liquid lens, the index of refraction is varied by varying a voltage to change the shape of a meniscus. Alternatively or additionally, the array of controllable lenses may be implemented to include a material whose index of refraction varies according to an applied voltage. For example, the refractive index of a layer of liquid crystal material changes with orientation of the crystals. In one implementation of an array of controllable lenses, a liquid crystal material is embedded in a glass structure, and a voltage is selectively applied to locally alter the material's index of refraction. The array of controllable microlenses may include a passive birefringent microlens component index-matched with an adjacent layer (such as an isotropic polymer) for one polarization (also called a "polarization activated microlens"), such that one polarization experiences a lensing effect but an orthogonal polarization does not, combined with a separate polarization switch (e.g., a liquid crystal panel) to determine whether or not the viewer views the display (or a portion thereof) according to the lensing effect.

A lenticular screen may be configured to support images having horizontal parallax only. For example, a one-dimensional array of vertical cylindrical lenses provides horizontal parallax only. Alternatively, a lenticular screen may be configured to support images having both horizontal and vertical parallax. For example, a two-dimensional array of round lenses may support both horizontal and vertical parallax if an appropriately coded image is displayed on the underlying panel.

A dynamic lenticular screen may be configured to be switchable between a two-dimensional mode and a three-dimensional mode. In some cases, the screen is configured to be locally switchable (e.g., from one lens to the next) between 2-D and 3-D modes. In one application of such a screen, a 2-D desktop display having control elements (such as a taskbar, GUI, and/or buttons, etc.) also includes a resizable and/or draggable window that presents a 3-D display. Typically the resolution and/or brightness of such a display will be higher in areas operating in the 2-D mode than in areas operating in the 3-D mode. Such a screen may be controlled to switch the display mode locally to two-dimensional at the location of a defect. For example, such a screen may be configurable to allow light from a particular pixel or group of pixels to pass to both views rather than only to one view.

An autostereoscopic display is typically configured such that the set of pixels visible to one of the viewer's eyes is separate from the set of pixels visible by the viewer's other eye. Therefore a defect compensation method as described herein may be adapted for use with an autostereoscopic display by performing a different minimization calculation for each eye, with each calculation being performed over a different corresponding set of masking pixels. Pixels that are adjacent within each set of masking pixels (i.e., pixels that are perceived by the viewer's eye to be adjacent) may not actually be adjacent on the display panel, such that the neighborhood over which the minimization calculation is performed may be discontinuous in one or both dimensions of the display plane of the panel. Mathematically, therefore, a display pixel in a two-view autostereoscopic display can be described by means of two PSFs (point spread functions), one for the left eye and one for the right eye. In the case of a multiview display, a pixel can be assigned as many PSFs as there are views available. Expression (1) may be extended to such a case as follows:

$$[C_1, C_2, \ldots, C_n] = \operatorname*{argmin}_{C_1, C_2, \ldots, C_n} \int_{-\infty}^{+\infty} \int_{-\infty}^{+\infty} \overline{f(v_1, v_2, \ldots, v_n, x', y')} dx' dy', \quad (11)$$

where $$v_j = E \times PSF_{je}(x', y') + \left[\sum_{i=1}^{n} C_i \times PSF_{ij}(x' - x'_i, y' - y'_i)\right]$$

for $1 \leq j \leq n$ (for a two-view display, n=2), $PSF_{je}$ indicates the PSF for the defect for view j, and $PSF_{ij}$ indicates the PSF for the i-th masking pixel for view j. Examples of $\overline{f(v_1, v_2, \ldots, v_n, x', y')}$ include $(\Sigma v_j)^2$, $\Sigma v_j^2$, $|\Sigma v_j|$, $\Sigma v_j^2/\sqrt{(x')^2+(y')^2}$, and $(\Sigma v_j)^2/\sqrt{(x')^2+(y')^2}$ for $1 \leq j \leq n$, although the cost function $f$ is not limited to these examples.

If there is no crosstalk in the stereoscopic display, then one of the PSFs in expression (11) would be all zero (no light falling on that eye) while the other PSF (or PSFs) will actually describe the light of that pixel falling on the other eye (or the other views). In case there is crosstalk between the views, then the PSFs will be non-zero in the views that suffer from crosstalk. As a practical matter, crosstalk usually exists in autostereoscopic displays. In such cases, the cost function $f$ may be configured to use one or more views to partially compensate for an error or errors in one or more other views. In another example, an error in only one view of a stereo pair may be very distracting to the viewer, and in such a case the cost function $f$ may be configured to introduce a related error in the other view of the stereo pair.

As described above, a defect compensation method may be used to calculate correction luminance values for a set of masking pixels. Additionally or alternatively, a defect correction method as applied to an autostereoscopic display may include altering the splitting screen to mask a defect. In the case of a parallax barrier, such a method may include altering the barrier to allow one view to receive light from a pixel of the other view. Such a result may be achieved, for example, by removing at least some of the barrier part that blocks light at that location. For such a case in which an overlap exists between the sets of pixels visible to each eye, it may be desirable for the two minimization calculations to observe one or more mutual constraints relating to the commonly visible pixels.

Figure 25:
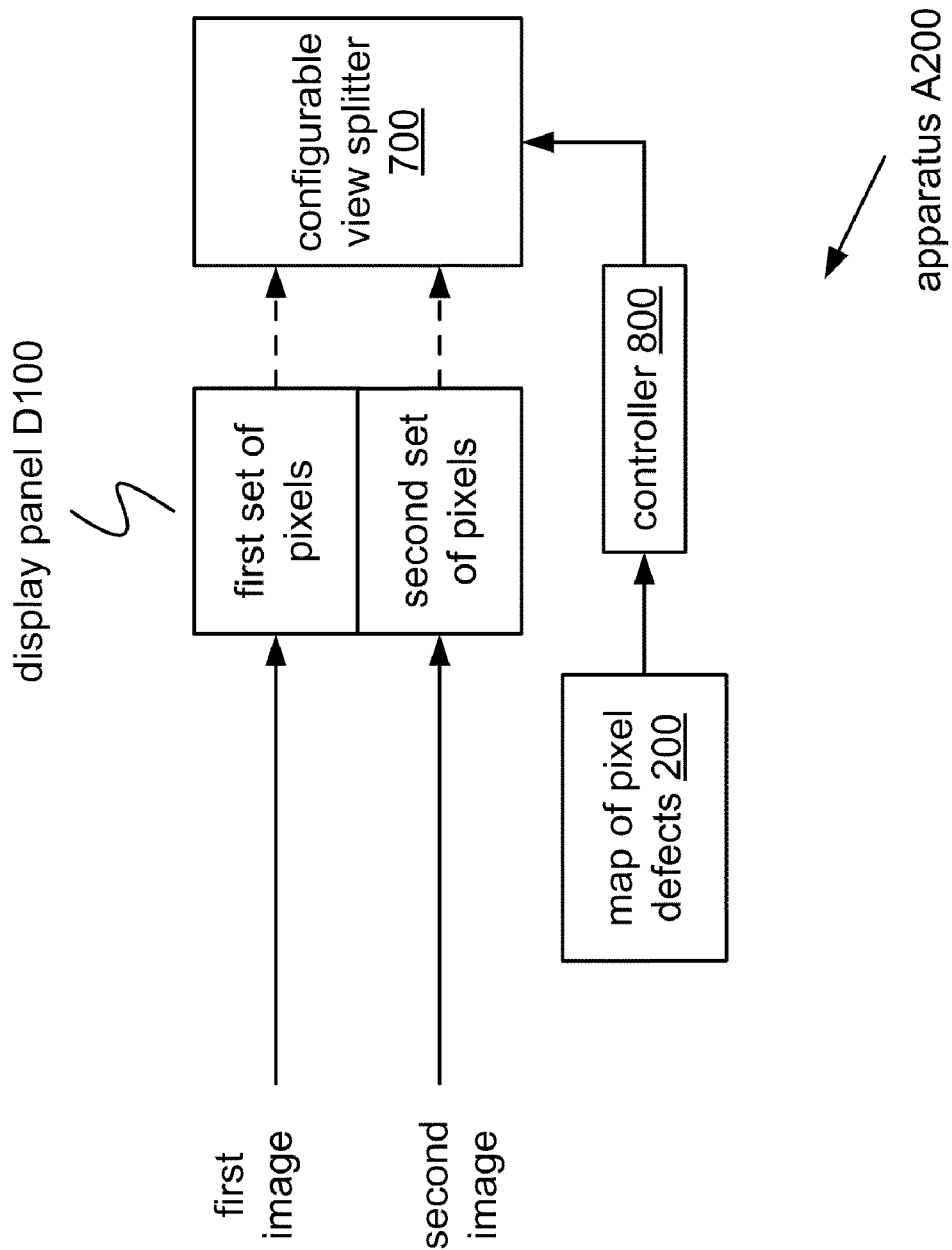
FIG. 25 shows a block diagram of an apparatus A200 according to an embodiment.

FIG. 25 shows a block diagram of an apparatus A200 according to an embodiment, which may be implemented within a display assembly. A display panel D100 is configured to display a first image on a first set of pixels (e.g., during a first time period such as a frame period or portion thereof) and to display a second image on a second set of pixels (e.g., during the first time period). Apparatus A200 may also include a display signal generator 600 as described above that is configured to convert one or both of the first and second images for display on the respective set of pixels (e.g., using one or more LUTs as shown in FIG. 6).

Apparatus A200 includes a configurable view splitter 700 that is configured (A) to pass more light from the first set of pixels in a first viewing direction than in a second viewing direction and (B) to pass more light from the second set of pixels in the second viewing direction than in the first viewing direction. For example, view splitter 700 may be a configurable implementation of a blocking screen (e.g., a parallax barrier) or a diverting screen (e.g., a lenticular screen) as described herein. In one particular example, apparatus A200 is configured to display the first image in a left viewing direction and the second image in a right viewing direction.

Apparatus A200 also includes a controller 800 that is configured to control view splitter 700, based on the location and response of at least one defective pixel of the display panel as indicated in a map of pixel defects 200, to vary the proportion of light passed in the first and second viewing directions at a corresponding location of the view splitter. The defective pixel responses may be expressed, for example, in terms of additive errors, multiplicative errors, nonlinear errors, and/or limit errors. For an example in which view splitter 700 is an LCD barrier, controller 800 may be configured to alter the pattern on the barrier. For an example in which view splitter 700 is an array of controllable lenses, controller 800 may be configured to alter the configuration of one or more of the lenses (e.g., by changing a driving voltage).

Controller 800 may be configured to control view splitter 700 to pass a substantially equal proportion of light in each of the viewing directions at or near a defective pixel. In a particular example, controller 800 is configured to control view splitter 700 to pass a substantially equal proportion of light in each of the viewing directions from a pixel of the second set of pixels that corresponds visually to a defective pixel of the first set of pixels.

It may be desirable to configure controller 800 to control view splitter 700 according to the visibility of a pixel defect for the first and/or second images. In such case, controller 800 may be configured to control view splitter 700 at or near a defective pixel based on information from (e.g., a corresponding local content of) one or both of the first and second images. For example, controller 800 may be configured to control view splitter 700 at a particular location based on one or more pixel values from a corresponding location or neighborhood of the first and/or second images, according to a variation of expression (1) (e.g., using expression (11)).

A luminance defect in a 3-D display may also create an inconsistency in the binocular image that can be very distracting to a viewer. If the view for one eye contains a defect that is not present in the view for the other eye, such that one eye sees the intended luminance but the other eye sees an abnormal luminance, a disturbing depth cue error may result. Such a view depicts a situation that is not physically possible, and the defect may have an effect on the viewer that is disproportionate to the affected area. Such distractions may be especially undesirable for applications such as imaging for medical diagnosis. Depth cue errors may arise in autostereoscopic displays as well as in some stereoscopic displays such as head-mounted displays (e.g., from a defect in one of the displays) and displays that use alternating polarizations (e.g., from a polarization-dependent defect in a pixel and/or a defect in one of the shutters).

In some cases of depth cue error, the defect may be sufficiently masked by applying a defect compensation method as described herein. In other cases, some depth cue error may remain due to a defect that cannot be fully compensated. In these cases, it may be desirable to artificially introduce one or more defects to mask the remaining depth error. For example, an artificial luminance and/or color defect may be introduced in one view to the extent that a corresponding luminance and/or color defect in the other view remains uncorrected. In one example, a defect of sixty grey levels can only be corrected to forty grey levels, such that a defect of twenty grey levels remains. In this case, an artificial defect of twenty grey levels is introduced into a corresponding location of the other view to compensate. A defect created in such manner that is consistent across the two views may be perceived as dust or some other minor imperfection and should be less disturbing to the viewer than a defect that creates a scene which is physically impossible.

A defect compensation method may be configured to introduce an artificial defect in one view to the extent of an uncorrected defect in the other view as described above. A defect compensation method may also be configured to perform a calculation that minimizes a depth cue distraction penalty, in addition to or in the alternative to minimizing a luminance and/or color defect penalty as described above.

Figure 26:
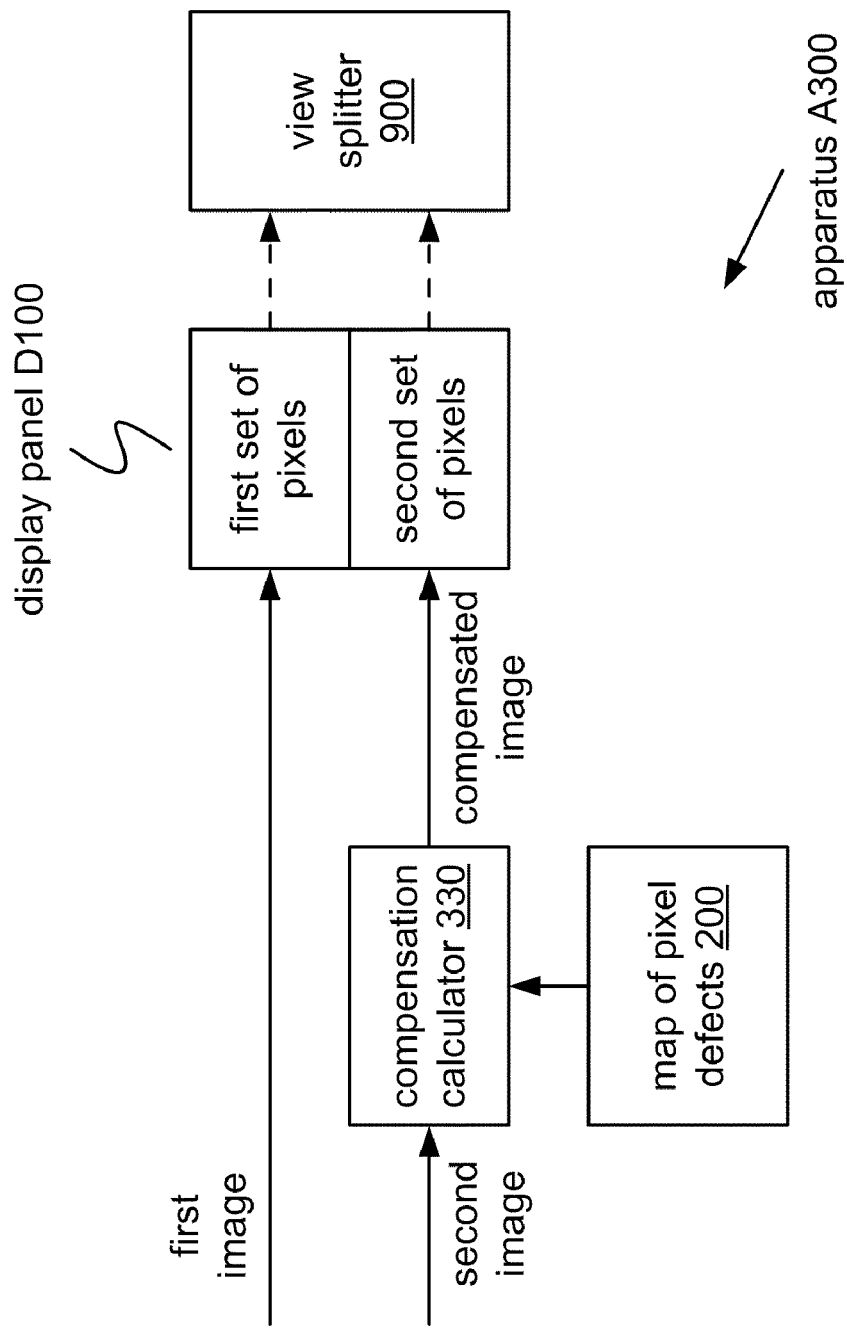
FIG. 26 shows a block diagram of an apparatus A300 according to an embodiment.
Figure 27:
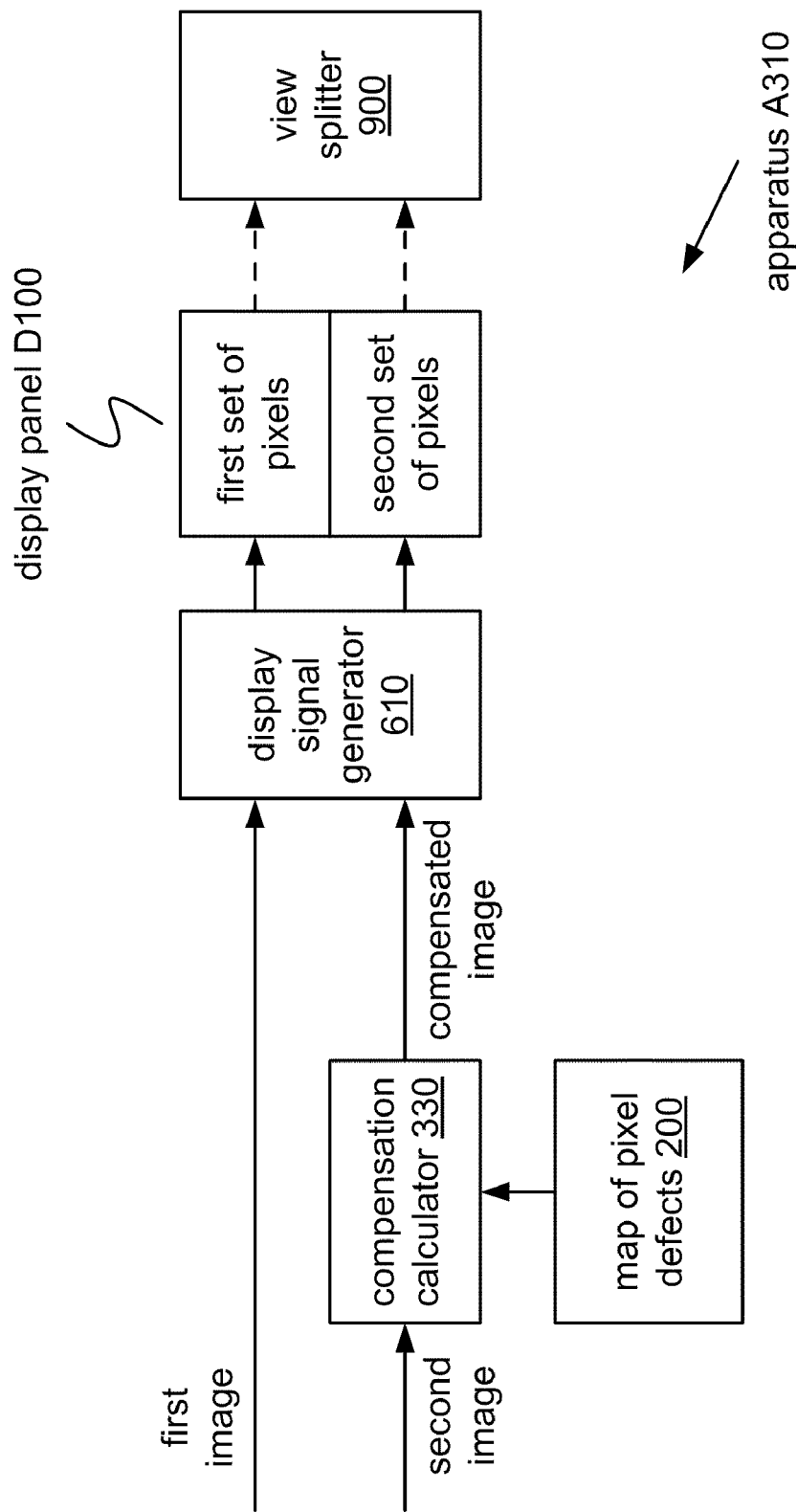
FIG. 27 shows a block diagram of an implementation A310 of apparatus A300.

FIG. 26 shows a block diagram of an apparatus A300 according to an embodiment, which may be implemented within a display assembly. A display panel D100 is configured to display a first image on a first set of pixels (e.g., during a first time period such as a frame period or portion thereof) and to display a compensated image on a second set of pixels (e.g., during the first time period). FIG. 27 shows a block diagram of an implementation A310 of apparatus A300 that includes an implementation 610 of display signal generator 600 as described above which is configured to convert one or both of the first and compensated images for display on the respective set of pixels (e.g., using one or more LUTs as shown in FIG. 6).

Apparatus A300 includes a view splitter 900 that is configured (A) to pass more light from the first set of pixels in a first viewing direction than in a second viewing direction and (B) to pass more light from the second set of pixels in the second viewing direction than in the first viewing direction. For example, view splitter 900 may be an implementation of configurable view splitter 700 or another (e.g., a fixed) implementation of a blocking screen or a diverting screen as described herein. In one particular example, apparatus A300 is configured to display the first image in a left viewing direction and the second image in a right viewing direction.

Apparatus A300 also includes an implementation 330 of compensation calculator 300 that is configured to calculate the compensated image based on the second image and on a map of pixel defects of the first set of pixels 200. Compensation calculator 330 is configured to calculate, for each of at least one defective pixel among the first set of pixels as indicated in map 200, and based on the location and response of the defective pixel, a pixel value for a corresponding location of the compensated image. Map 200 may be configured to express the defective pixel responses, for example, in terms of additive errors, multiplicative errors, nonlinear errors, and/or limit errors.

Compensation calculator 330 may be configured to calculate the compensated image according to a variation of expression (1) (e.g., using expression (11)). For example, compensation calculator 330 may be configured to calculate a pixel value for a particular location of the compensated image based on one or more pixel values from a corresponding location or neighborhood of the first image. FIGS. 21A-C show several examples of possible relations between pixel values of the first and/or second images and pixel values of the compensated image at locations that correspond visually to a hypothetical location of a defective pixel as indicated in map 200.

The 3-D image of an autostereoscopic display is typically visible only within a relatively small "sweet spot," which is normally only about five to ten centimeters wide at a specified viewing distance from the panel (e.g., 70 centimeters). To some extent, this sweet spot may be moved laterally (and/or vertically, if the display supports vertical parallax) by changing the image displayed on the panel. It may be desirable for an installation including an autostereoscopic display as described herein to also include a head-tracking apparatus such that the displayed image may be configured to move the sweet spot according to the current location of the viewer's eyes. For example, an autostereoscopic display may be configured to dynamically control the splitting screen to redirect the different views according to the predicted or detected current eye position.

Examples of head-tracking apparatus include ultrasonic ranging devices that locate the viewer's head. Other examples include visible-light and/or infrared imagers that track the position of the viewer's head and/or eyes. Such apparatus may be mounted to the display or independently mounted.

One of the more effective types of head-tracking apparatus is a device in which two images of the viewer's face are taken at the same time or within a short time period. One of the images is taken under normal illumination and/or by a camera sensitive only to visible light. The other image is taken under infrared illumination and/or by a camera sensitive to infrared light. The two images are compared (e.g., subtracted) to determine the location of the viewer's eyes, as the eye tends to reflect infrared light much more than other parts of the body. One form of such a device is called a "blinking infrared" head-tracker because it flashes infrared illumination for alternate images.

An autostereoscopic display may also be implemented as a multiview display that simultaneously generates a 3-D view for more than one sweet spot at a time. Resolution of such a display usually decreases in proportion to the number of different views. FIG. 24B shows one example of a generation of four different views from adjacent pixels. Alternatively, a multiview display implemented with a dynamic splitting screen may be configured to operate the panel and screen in synchronism for time-multiplexed generation of multiple views. A multiview display may also be combined with head-tracking (e.g., individual head-tracking of multiple viewers). A defect compensation method as described herein may be adapted for application to a multiview display (for example, by performing a different pair of minimization calculations for each view).

The foregoing presentation of the described embodiments is provided to enable any person skilled in the art to make or use the invention as claimed below. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a physical medium for data storage (e.g., volatile or non-volatile semiconductor memory, one or more magnetic or optical disks, etc.) as machine-readable code, such code being instructions executable by an array of logic elements such as a microprocessor or other digital signal processing unit. An implementation of method M100 may be performed within a computer system at any of the locations described with reference to FIG. 8 above.

Various elements of implementations of apparatus A100, A200, and A300 (e.g., image generator 100, map of pixel defects 200, compensation calculator 300, display signal generator 600, and/or controller 800) may be implemented as electronic and/or optical devices residing, for example, on the same chip or among two or more chips in a chipset, although other arrangements without such limitation are also contemplated. One or more such elements may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits).

It is possible for one or more elements of an implementation of apparatus A100, A200, or A300 to be used to perform tasks or execute other sets of instructions that are not directly related to an operation of the apparatus, such as a task relating to another operation of a device or system in which the apparatus is embedded. It is also possible for one or more elements of an implementation of apparatus A100, A200, or A300 to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The descriptions of apparatus herein (e.g., of implementations of apparatus A100, A200, and A300) are expressly intended to disclose methods of image processing and/or display having analogous features (as well as computer program products having machine-executable instructions describing such methods), and the descriptions of methods of image processing and/or display herein (e.g., of implementations of method M100) are expressly intended to disclose apparatus that have analogous features. Methods of defect compensation as described herein may also be applied to other pixel-addressable display technologies such as plasma display panels (PDPs). Thus, the attached claims are not intended to be limited to the particular embodiments shown above but rather are to be accorded the widest scope consistent with the principles and novel features disclosed in any fashion herein.

What is claimed is:

1. A stereoscopic display assembly configured to receive a first image and a second image, said assembly comprising:
a display panel having a first set of pixels and a second set of pixels;
a map of pixel defects of the first set of pixels of the display panel;
a view splitter configured to (A) pass more light from the first set of pixels in a first direction than in a second direction and (B) pass more light from the second set of pixels in the second direction than in the first direction; and
a compensation calculator configured to calculate a compensated image based on (A) the second image and (B) the map of pixel defects,
wherein the display panel is configured (A) to display on the first set of pixels, during a first time period, an image based on the first image and (B) to display on the second set of pixels, during the first time period, an image based on the compensated image, and
wherein, for each of at least one defective pixel among the first set of pixels as indicated in the map of pixel defects, said compensation calculator is configured to calculate, based on a location and response of the defective pixel, a pixel value for a corresponding location of the compensated image.

2. The stereoscopic display assembly according to claim 1, wherein said compensation calculator is configured to calculate said pixel value, for said each of at least one defective pixel, to create a visible defect at said corresponding location.

3. The stereoscopic display assembly according to claim 1, wherein said compensation calculator is configured to calculate said pixel value, for said each of at least one defective pixel, to create a visible luminance defect at said corresponding location.

4. A stereoscopic display assembly configured to receive a first image and a second image, said assembly comprising:
a display panel configured and arranged (A) to display, on a first set of pixels of the display panel, an image based on the first image and (B) to display, on a second set of pixels of the display panel, an image based on the second image;
a map of pixel defects of the display panel;
a view splitter configured (A) to pass more light from the first set of pixels in a first viewing direction than in a second viewing direction and (B) to pass more light from the second set of pixels in the second viewing direction than in the first viewing direction; and
a controller configured to control said view splitter, based on a location and response of each of at least one defective pixel of the display panel as indicated in the map of pixel defects, to vary the proportion of light passed in the first and second viewing directions at a corresponding location of said view splitter.

5. The stereoscopic display assembly according to claim 4, wherein said view splitter includes a parallax barrier.

6. The stereoscopic display assembly according to claim 4, wherein said view splitter includes an array of lenses.

7. The stereoscopic display assembly according to claim 4, wherein said view splitter includes an array of controllable lenses.

8. The stereoscopic display assembly according to claim 7, wherein at least one of said array of controllable lenses comprises a material whose index of refraction is electrically controllable.

9. The stereoscopic display assembly according to claim 4, wherein said view splitter includes a pair of filters, each filter having a response that differs significantly from the response of the other filter with respect to at least one among (A) a polarization direction and (B) a visible wavelength.

10. The stereoscopic display assembly according to claim 4, wherein said varying the proportion of light passed at said corresponding location comprises passing an equal proportion of light in the first and second viewing directions.

11. The stereoscopic display assembly according to claim 4, wherein said varying the proportion of light passed at said corresponding location is based on a pixel value at a corresponding location of the first image.

12. The stereoscopic display assembly according to claim 4, wherein said varying the proportion of light passed at said corresponding location is based on a pixel value at a corresponding location of the second image.

13. The stereoscopic display assembly according to claim 4, wherein said varying the proportion of light passed at said corresponding location comprises creating a visible defect at said corresponding location among said second set of pixels.

14. A method of stereoscopic display, said method comprising:
displaying, on a first set of pixels of a display panel and during a first time period, an image based on a first image;
calculating a compensated image based on (A) a second image and (B) a map of pixel defects of the first set of pixels of the display panel;
displaying, on a second set of pixels of the display panel and during the first time period, an image based on the compensated image;
passing more light from the first set of pixels in a first direction than in a second direction; and
passing more light from the second set of pixels in the second direction than in the first direction; and
wherein said calculating the compensated image comprises calculating, for each of at least one defective pixel among the first set of pixels as indicated in the map of pixel defects, based on a location and response of the defective pixel, a pixel value for a corresponding location of the compensated image.

15. The method according to claim 14, wherein said calculating the compensated image is based on a model of a sensitivity characteristic of a human visual system.

16. The method according to claim 14, wherein said calculating the compensated image comprises calculating said pixel value, for said each of at least one defective pixel, to create a visible defect at said corresponding location.

17. The method according to claim 14, wherein said calculating the compensated image comprises calculating said pixel value, for said each of at least one defective pixel, to create a visible luminance defect at said corresponding location.

18. The method according to claim 14, wherein said calculating the compensated image comprises, for each of at least one of the defective pixels indicated in the map of pixel defects, and based on (A) a location and response of the defective pixel and (B) a plurality of pixel values within a neighborhood of a corresponding location of the first image, calculating a pixel value for a corresponding location of the compensated image.

19. The method according to claim 14, wherein said calculating the compensated image comprises, for each of at least one of the defective pixels indicated in the map of pixel defects, and based on (A) a location and response of the defective pixel and (B) a pixel value at a corresponding location of the second image, calculating a plurality of pixel values within a neighborhood of a corresponding location of the compensated image.

20. The method according to claim 14, wherein said first direction is a left viewing direction, and wherein said second direction is a right viewing direction.

* * * * *